United States Patent
Morton et al.

(10) Patent No.: US 9,306,744 B2
(45) Date of Patent: Apr. 5, 2016

(54) VIDEO CRYPTOGRAPHY SYSTEM AND METHOD

(71) Applicant: Gazoo, Inc., Bryan, TX (US)

(72) Inventors: Joseph Scott Morton, College Station, TX (US); Christopher Michael McDonald, Bryan, TX (US); Glenn Donald Knepp, College Station, TX (US)

(73) Assignee: GAZOO, INC., Bryan, TX (US)

( * ) Notice: Subject to any disclaimer, the term of this patent is extended or adjusted under 35 U.S.C. 154(b) by 0 days.

(21) Appl. No.: 14/642,747

(22) Filed: Mar. 9, 2015

(65) Prior Publication Data

US 2015/0256898 A1 Sep. 10, 2015

Related U.S. Application Data

(63) Continuation-in-part of application No. 14/642,639, filed on Mar. 9, 2015, and a continuation-in-part of application No. 14/642,718, filed on Mar. 9, 2015, and a continuation-in-part of application No. 14/642,732, filed on Mar. 9, 2015.

(60) Provisional application No. 61/950,289, filed on Mar. 10, 2014.

(51) Int. Cl.
*H04L 9/08* (2006.01)
*H04N 21/2347* (2011.01)
*H04N 21/4405* (2011.01)

(52) U.S. Cl.
CPC .......... *H04L 9/0869* (2013.01); *H04N 21/2347* (2013.01); *H04N 21/4405* (2013.01); *H04L 2209/24* (2013.01); *H04L 2209/601* (2013.01)

(58) Field of Classification Search
CPC ............ G06F 7/58–7/588; H04L 9/08–9/0897
See application file for complete search history.

(56) References Cited

U.S. PATENT DOCUMENTS 8,200,796 B1 6/2012 Margulis
2005/0135608 A1* 6/2005 Zheng .................. H04L 9/0662
380/28

(Continued)

FOREIGN PATENT DOCUMENTS

CN 1220346 C 9/2005

OTHER PUBLICATIONS

Armstrong, "Amazon AppStream—Let the Cloud Do the Heavy Lifting", i Programmer, Publication [online]. Nov. 14, 2013 [retrieved May 19, 2015], Retrieved from the internet:<URL: http://www.i-programmer.info/news/141-cloud-computing/6604-amazon-appstream.html>; pp. 1-3.

(Continued)

*Primary Examiner* — Dede Zecher
*Assistant Examiner* — Vadim Savenkov
(74) *Attorney, Agent, or Firm* — Kevin M. Klughart; David W. Carstens; Carstens & Cahoon, LLP

(57) ABSTRACT

A system and method implementing stenographic cryptography in a video data stream (VDS) is disclosed that embeds secret video data (SVD) in a graphical user experience (GEX) generated by a host computing system (HCS) and streamed to a remote user on a mobile computing device (MUD). The system and method augments existing secure communications by applying steganography to a bidirectional GEX of indefinite length. The security risk associated with the use of a single steganographic key for indefinite VDS lengths is mitigated by the use of a self-regulating indefinite stream system (SRIS). The SRIS is composed of an initialization vector system (IVS), a self-seeding reference key system (SRKS), and a non-contiguous pixel/frame reference system (NPRS) to provide continuous security for the entire VDS life. The NPRS utilizes an adaptive steganographic capacity system (ASCS) to vary the SVD placement and complexity based on the steganographic capacity of each video frame.

27 Claims, 24 Drawing Sheets

(56) References Cited

U.S. PATENT DOCUMENTS

| | | |
|---|---|---|
| 2006/0013390 A1 | 1/2006 | Herz et al. |
| 2008/0056671 A1 | 3/2008 | Kamijo et al. |
| 2008/0263361 A1* | 10/2008 | Dutta et al. ............ 713/182 |
| 2010/0313226 A1 | 12/2010 | Cholas et al. |
| 2011/0093822 A1 | 4/2011 | Sherwani |
| 2011/0208837 A1 | 8/2011 | Sartori |
| 2011/0296179 A1* | 12/2011 | Templin et al. ............ 713/168 |
| 2011/0314356 A1 | 12/2011 | Grube et al. |
| 2012/0076197 A1 | 3/2012 | Byford et al. |
| 2012/0149476 A1 | 6/2012 | Perlman et al. |
| 2012/0254450 A1 | 10/2012 | Lejeune et al. |
| 2013/0013828 A1 | 1/2013 | Pang et al. |
| 2013/0239134 A1 | 9/2013 | Lajoie et al. |
| 2013/0268775 A1* | 10/2013 | Hawkins ............ 713/189 |
| 2013/0279877 A1 | 10/2013 | Boak |
| 2013/0291006 A1 | 10/2013 | Tam |
| 2013/0311768 A1 | 11/2013 | Fosmark et al. |
| 2014/0052770 A1 | 2/2014 | Gran et al. |
| 2014/0245339 A1* | 8/2014 | Zhang et al. ............ 725/18 |
| 2014/0372754 A1* | 12/2014 | Aissi et al. ............ 713/168 |

OTHER PUBLICATIONS

The International Search Report and the Written Opinion of the International Searching Authority for International Application No. PCT/US2015/019757.

* cited by examiner

FIG. 15

| Fundamental Steganographic Terminology | Traditional Multimedia Steganographic Methods | Present Invention |
|---|---|---|
| Embedding Algorithm (EMA) | Located on UEX #1 (user device) | Located on HCS |
| Secret Message | Text (most common), image, or video (rare) | GEX |
| Secret Shared Key (controls the embedding and extraction algorithms) | Embedded key to decrypt the secret message | GEX encryption key |
| Cover Object | Image or Video | Video |
| Stego Object (sent through Internet) | Encrypted video stream containing text, image, or video | Encrypted video stream containing the UEX |
| Extraction Algorithm (EXA) | Located on a single or multiple UEXs that are differen from the original user device(s) | Located on user device |

1500

VIDEO CRYPTOGRAPHY SYSTEM AND METHOD

CROSS REFERENCE TO RELATED APPLICATIONS

U.S. Provisional Patent Applications

This application claims benefit under 35 U.S.C. §119 and incorporates by reference United States Provisional Patent Application for CLOUD COMPUTING SYSTEM AND METHOD by inventors Joseph Scott Morton, Christopher Michael McDonald, and Glenn Donald Knepp, filed electronically with the USPTO on Mar. 10, 2014, with Ser. No. 61/950,289, EFS ID 18414620, confirmation number 2283.

U.S. Utility Patent Applications

This application claims benefit under 35 U.S.C. §120 and incorporates by reference United States Utility Patent Application for CLOUD COMPUTING SYSTEM AND METHOD by inventors Joseph Scott Morton, Christopher Michael McDonald, and Glenn Donald Knepp, filed electronically with the USPTO on Mar. 9, 2015, with Ser. No. 14/642,639, EFS ID 21718675, confirmation number 1436.

This application claims benefit under 35 U.S.C. §120 and incorporates by reference United States Utility Patent Application for MULTI-USER DISPLAY SYSTEM AND METHOD by inventors Joseph Scott Morton, Christopher Michael McDonald, and Glenn Donald Knepp, filed electronically with the USPTO on Mar. 9, 2015, with Ser. No. 14/642,718, EFS ID 21719217, confirmation number 1333.

This application claims benefit under 35 U.S.C. §120 and incorporates by reference United States Utility Patent Application for VIDEO CRYPTOGRAPHY SYSTEM AND METHOD by inventors Joseph Scott Morton, Christopher Michael McDonald, and Glenn Donald Knepp, filed electronically with the USPTO on Mar. 9, 2015, with Ser. No. 14/642,732, EFS ID 21719340, confirmation number 7712.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

This application claims benefit under 35 U.S.C. §120 and incorporates by reference United States Utility Patent Application for VIDEO STREAMING SYSTEM AND METHOD by inventors Joseph Scott Morton, Christopher Michael McDonald, and Glenn Donald Knepp, filed electronically with the USPTO on Mar. 9, 2015, with Ser. No. 14/642,732, EFS ID 21719340, confirmation number 7712.

PRIOR ART AND BACKGROUND OF THE INVENTION

Prior Art

Cryptography is the science of encrypting data in such a way that one cannot understand the encrypted message, whereas in steganography the mere existence of data is concealed, such that even its presence cannot be noticed. Using cryptography might raise some suspicion whereas in steganography the existence of a secret message is invisible and thus not known. One can think of steganography as an extension of cryptography, and it is commonly used under the circumstances where encryption is not allowed. Steganography is commonly used to pass secret data via insecure channels over the computer communication network (CCN) (the Internet or other) without detection. Steganalysis is the investigation or study of detecting hidden messages that used steganography for hiding and is analogous to cryptanalysis applied to cryptography. In this document "encryption" will be used to describe a combined steganographic and cryptographic encryption process, and "cryptography" will include steganography.

A Virtual Desktop Infrastructure (VDI) is a desktop-oriented service that hosts user-desktop environments on remote servers and/or blade PCs. Users accessed the desktops over a network using a remote display protocol. A connection-brokering service connects users to their assigned desktop sessions. For users, this means they can access their desktop from any location, without having to use a single client device. Since the resources are centralized, users moving between work locations can still access the same desktop environment with their applications and data using multiple different client devices if necessary.

However, VDI implementations allow for delivering a personalized workspace back to a user, which retains all the user's customizations. There are several methods to accomplish this. One is to deliver fully persistent VM desktops, in which a user gets a dedicated desktop that functions essentially as their own PC. Another mode is to deliver non-persistent desktops which do not include user personalization. These are VM desktops delivered from a pool which are then used for a session and returned to the pool. This approach has the advantage of keeping VM desktops "clean" as nothing is saved to the image by the user. Non-persistent desktops can be paired with user virtualization technologies to deliver user profiles and customizations (and all profiles settings, application data settings, configuration and user data), to the user upon login. The user profile is matched with a non-persistent desktop providing an experience that is very little different from a PC. All changes made to the user profile are saved to the profile and are restored to the user upon their next login. However, the VM is returned to the pool with no changes saved to it.

Exemplary embodiment of our invention is best suited when applying the cryptographic and steganographic techniques in a cloud virtual desktop infrastructure. A physical server or virtual server in a datacenter is streamed to a remote client where the client interacts with this stream using a different protocol or channel to control the server and its applications. It is inferred that the client must first be authorized access to the server system. Authentication may take place on a separate system dedicated to authorization services. This scenario lends itself nicely where steganographic and cryptographic techniques may be used effectively.

The implementation of multimedia cryptographic systems and methods typically involves manual encryption of individual containerized multimedia files on an initial MCD. Secret source data is encrypted with one or more generated keys in cover multimedia data (CMD) before, during, or after the video encoding process. The resulting encrypted video and generated key(s) are then transmitted separately via the computer communication network (CCN) to one or many terminal MCDs. The terminal MCD(s) then decrypt the secret target data from the decoded CMD with the generated key(s).

Some networked variations of this configuration exist where the host transmits the encrypted multimedia email via email, public post on a social website, USB, or any other computer communication method.

These transmission of encrypted media to one or more end users using this traditional methodology is limiting when considering remote computing for several reasons including:
- The generated key(s) must be sent independently of the EVS creating two potential modes of detection.
- The generated keys and EVS must be manually input by users and shared via a user communication network (UCN) which may or may not be the CCN.

All of these issues may result in a cryptography system or method that is insecure, require advanced programming knowledge, or lack in its ability to stream multimedia.

Conventional VPN Implementations

As an example of conventional prior art, virtual private networks (VPN) are the business standard for secure data transmission. When businesses communicate over the Internet, there is no protection promised or implied. Everything is done out in the open and can be seen, captured, destroyed or copied by anyone who cares to try. This communication media is analogous to cities, towns, and villages connected by roads. It is possible transport whatever is on those roads at your own risk. Businesses began to see the need for a safer alternative as they did business with remote partners and employees in remote locations. Thus, the Virtual Private Network (VPN) was invented.

VPNs use encryption to protect the traffic between any two points. This is analogous to building a tunnel with special access controls between those cities, towns, and villages. The tunnels are not available to everyone, and to the people up above, they are invisible. Before it is possible enter the tunnel, you must prove your identity, your packages must be of certain types and the delivery address must be verifiable. If this does not provide sufficient security, a VPN also has the ability to disguise the packages through encryption. In this manner, if someone manages to gain unauthorized access by fooling the access guards or by digging another tunnel that intersects with your tunnel, the intruder will not know which packages to steal because he cannot distinguish one from another.

VPNs are capable of encrypting two different ways: transport and tunneling. The transport encryption sets up a secure, encrypted link across the Internet wires, and it encrypts the data (payload) sent to the other end. This is the equivalent of the delivery truck carrying a package via the underground passageway. The encryption is invisible to the user and other than passwords, pass-phrases, or a special card to plug into the computer, the user does not have to press a button that says "encrypt" or "decrypt." All the data in transit is protected from sight. The only drawback to transport encryption is the fact that the headers on the data are sent in the clear. In effect, this is equivalent to disguising the package and then putting a label on it that says what is inside. As such, this is a non-optimal approach to data security considering that intruders may occasionally gain access.

The other form of VPN encryption, tunneling, not only sets up a secure, encrypted link between two points, but it also encrypts the headers of the data packets. This is generally thought to be a better overall approach. Not only is it possible to have a disguised package, but the address and the contents listed on the package label are in code so they are not easily recognizable.

As can be seen from the above discussion, VPN simulates secure UEX streaming with encrypted source data with an encryption "tunnel."

Deficiencies in the Prior Art

The prior art as detailed above suffers from the following deficiencies:
(1) Prior art video/multimedia cryptography systems and methods that use steganography in conjunction with cryptography typically are limited to merging source data into pre-existing video/multimedia.
(2) Prior art video/multimedia cryptography systems and methods typically require users to manually encrypt, transmit, and decrypt source data in video/multimedia.
(3) Prior art video/multimedia cryptography systems and methods typically have been limited to video/multimedia transmission with a definitive beginning and ending.
(4) Prior art video/multimedia cryptography systems and methods typically support only unidirectional transfer of data between a mobile devices and computing systems.
(5) Prior art video/multimedia cryptography system and methods are not responsive in situations where the CCN bandwidth is limited.
(6) Prior art video/multimedia cryptography systems and methods typically requires maximum software application development to occur on the MCD to support the bidirectional EVS.
(7) Prior art video/multimedia cryptography systems and methods typically require the use of a virtual private network (VPN) to maintain security between the HCS and MCD.
(8) Prior art video/multimedia cryptography systems and methods typically do not adjust for the MCD display environment of the end-user.

While some of the prior art may teach some solutions to several of these problems, the core deficiencies in the prior art systems have not been addressed.

OBJECTIVES OF THE INVENTION

Accordingly, the objectives of the present invention are (among others) to circumvent the deficiencies in the prior art and affect the following objectives:
(1) Provide for a video/multimedia cryptography system and method that uses steganography in conjunction with cryptography to permit the merging of both GEX display data and source data files.
(2) Provide for a video/multimedia cryptography system and method to self-sustain encryption, transmission, and decryption source data in video/multimedia.

(3) Provide for a video/multimedia cryptography system and method to sustain a secure open-ended broadcast without a definitive end point.

(4) Provide for a video/multimedia cryptography system and method to be responsive to the steganographic capacity of the video/multimedia container.

(5) Provide for a video/multimedia cryptography system and method to embed secure information into a video stream to support bidirectional transfer of data between a mobile device and a host computer.

(6) Provide for a video/multimedia cryptography system and method that provides responsive security adaptation in situations where the CCN bandwidth is limited.

(7) Provide for a video/multimedia cryptography system and method that is responsive in situations where the MCD processing power is limited.

(8) Provide for a video/multimedia cryptography system and method that consumes minimal CCN bandwidth in sending the EVS to the MCD.

(9) Provide for a video/multimedia cryptography system and method that requires minimum software application development to occur on the MCD to support the bidirectional EVS.

(10) Provide for a video/multimedia cryptography system and method that does not require the use of a virtual private network (VPN) to maintain security between the HCS and MCD.

(11) Provide for a video/multimedia cryptography system and method that seamlessly ports to the MCD display environment.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention supports the deployment of a graphical user experience (GEX) encrypted within the video stream transmitted between the HCS and MCD. This use of steganographic encryption may form the basis for a secure web browser interface that provides an added layer of security on top of that provided by conventional web browser services.

In an exemplary invention system embodiment the host computing system (HCS) is configured to stream a graphical user experience (GEX) of a resource intensive process to a remote user on a mobile computing device (MCD) with limited compute resources. The GEX data is embedded with source data (which may or may not be encrypted prior) using stenography during the encoding process. The output is the encrypted video stream (EVS) and it's embedded key (EMK), which is transmitted over the computer communication network (CCN) to one or more MCDs. The EMK is carried within the EVS as part of a self-regulating broadcast method (SBM). The SRM is initiated by an initialization vector technique (IVT) designed to ensure the generation of a random key based on indeterminate user interaction with the system. The EVS is decoded and decrypted on the MCD making immediate use of the GEX data in the graphical experience mapper (GEM) for display to the remote user. User interactions on the MCD with the GEM display data are then streamed back to the HCS via an encrypted user input stream. This allows for encrypted bidirectional transfer of various source data types.

By utilizing streamed MPEG video rather than transmitting display images frame-by-frame from the HCS to the MCD, the processing requirements for encrypting the GEX data with the source data is minimized and thus reduces overall communication latency. The decrypted source data is made available to the user. Within this context an EVS of indefinite length may be supported whereby an end-user may use the HCS resources for any length of time in a secure communication environment.

BRIEF DESCRIPTION OF THE DRAWINGS

For a fuller understanding of the advantages provided by the invention, reference should be made to the following detailed description together with the accompanying drawings wherein:

FIG. 15 illustrates a table comparing the prior art with the present invention;

DESCRIPTION OF THE PRESENTLY PREFERRED EXEMPLARY EMBODIMENTS

Figure 1:
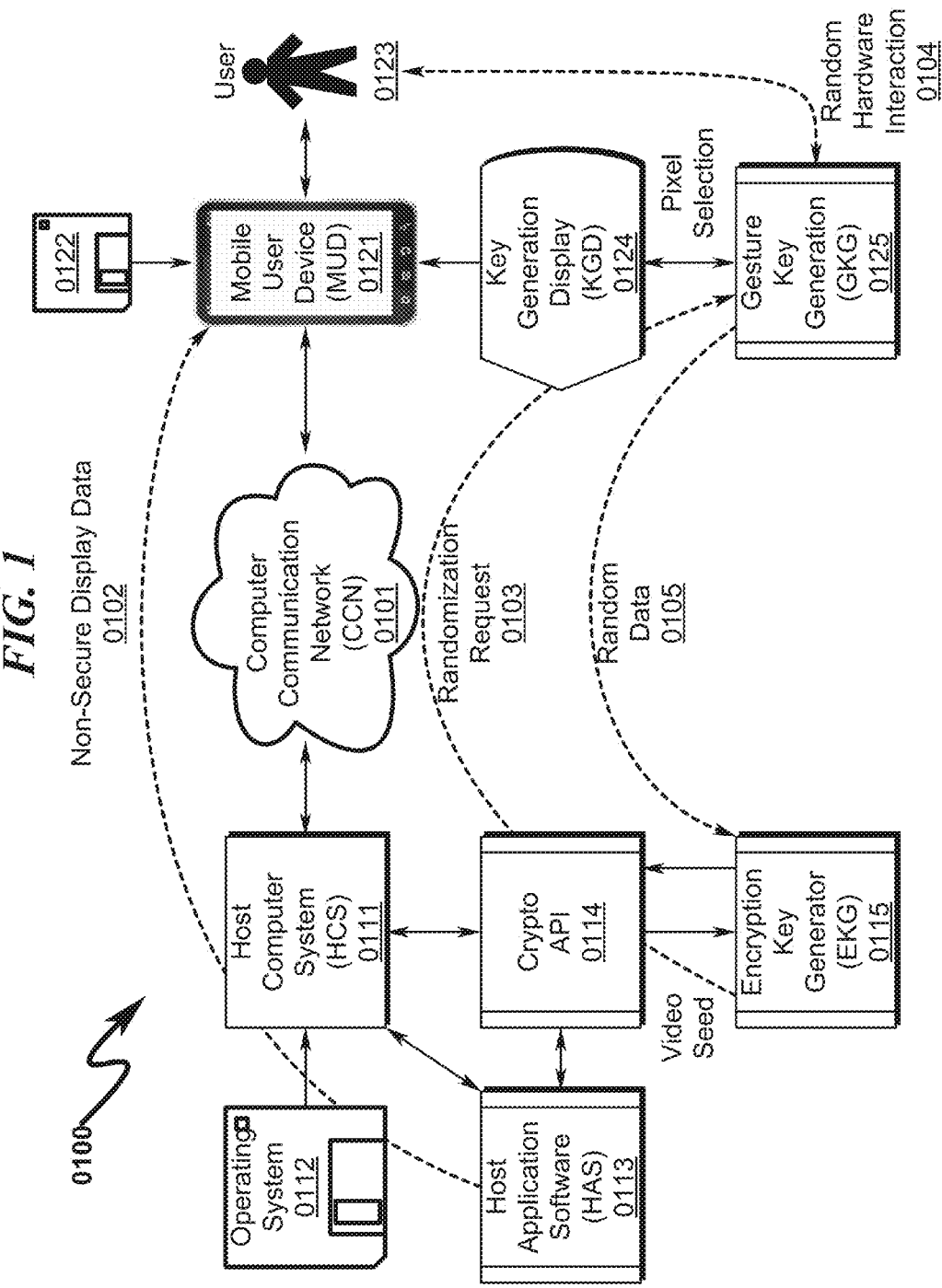
FIG. 1 illustrates an overview system block diagram depicting a preferred exemplary invention system embodiment.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a VIDEO CRYPTOGRAPHY SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Video/Multimedia not Limitive

The present invention is equally applicable to video and multimedia communication, and as such the terms video, video/multimedia, and multimedia should be given broad interpretation within this discussion and disclosure.

Mobile User/Computing Device not Limitive

The present invention may utilize a variety of mobile user devices (MUD) and/or mobile computing devices (MCD) to implement various aspects of the invention. Within the context of this discussion, the terms MUD and MCD will be equivalently be used to describe a user device having digital computing capability and a display capable of presenting pictorial and/or video information.

Remote Video Stream not Limitive

The present invention anticipates that a wide variety of remote video streaming formats may be used to implement the video cryptography component of the present invention. Without limitation, the RVS may include audio and/or video formats including but not limited to: MPEG; MPEG-2; MPEG-4; H.264; THEORA; WEBM; DIRAC; REALVIDEO; VP8; and HEVC.

Host Computer System HOS not Limitive

The present invention anticipates that a wide variety of host computer system and host operating system software (HOS) may be used to implement the present invention. Without limitation, the HOS may include MICROSOFT® WINDOWS®; MAC®; and LINUX® operating system products.

General Concepts

The present invention anticipates that some preferred embodiments may incorporate steganographic encryption within the video stream transmitted between the HCS and MUD. This use of steganographic encryption may form the basis for a secure web browser interface that provides an added layer of security on top of that provided by conventional web browser services.

Steganography is the art or practice of concealing a message, image, or file within another message, image, or file. The advantage of steganography over cryptography alone is that the intended secret message does not attract attention to itself as an object of scrutiny. Plainly visible encrypted messages (no matter how unbreakable) will arouse interest, and may in themselves be incriminating in countries where encryption is illegal. Thus, whereas cryptography is the practice of protecting the contents of a message alone, steganography is concerned with concealing the fact that a secret message is being sent, as well as concealing the contents of the message.

Steganography includes the concealment of information within computer files. In digital steganography, electronic communications may include steganographic coding inside of a transport layer, such as a document file, image file, program, or protocol. Media files are ideal for steganographic transmission because of their large size. For example, a sender might start with an innocuous image file and adjust the color of every 100th pixel to correspond to a letter in the alphabet, a change so subtle that someone not specifically looking for it is unlikely to notice it.

There are a few terms that need to be defined when discussing video capture and streaming. It is necessary to define reference points in a time domain with respect to when a video is processed and when it is streamed. When using the terms real-time or near real-time, it is inferred to be nearest to the present in time. With respect to video capture, it is inferred that a video capture device is used and converts a video signal into a format that can be stored, processed (encoded), and/or forwarded once in a streaming format. Two prevalent methods of streaming video are on-demand streaming and live streaming.

At Rest Data

When a video is captured, converted, and stored to a physical medium, it is considered data at rest until such time it may be processed for streaming, regardless of the amount of time that had elapsed from when it was captured and stored to when it was streamed. Serving video media this way is also referred to as streaming On-Demand. During this process the video media may be received by a viewer or player by streaming the video media as a download (in its entirety) to a local computer for playback. When video content from source media is captured, converted, encoded, and streamed real-time, it is considered live streamed.

Receiving Video Media

The video media may be received using several methods:
DOWNLOAD—where the entire video is sent. Playback starts after the entire file has been downloaded.
PROGRESSIVE DOWNLOAD—where the entire video is sent. Playback begins after a portion of the video has been downloaded.
REAL-TIME STREAMING—sends a continuous stream of video for almost instantaneous playback.

Live streaming, also refers to content delivered live over the Internet, requires a form of source media (e.g. a video camera, an audio interface, screen capture software), an encoder to digitize the content, a media publisher, and a content delivery network to distribute and deliver the content.

Steganalysis

Steganalysis is the study of determining whether or not a transport medium carrying a document or multimedia file contains a secret message. Steganalysis mainly a statistical approach, whereby a container file is represented as a set of numeric functions. These functions usually model a container file in part, and will attempt to determine whether a message is embedded within it. The goal of determining the content of a message is reserved for the field of forensic steganalysis.

Prior Art Techniques

There is a growing range of techniques for embedding data in video container files, many of them built on the principles of image steganography. For instance, a large number of techniques use DCT coefficients and as such, these techniques are limited to the MPEG video codec. Recently, more versatile techniques such as motion vector based approaches have started to emerge and are quickly becoming commonplace.

Streaming video across the internet has become incredibly popular over the last seven years. Some of the steganographic approaches that have been discussed were proposed specifically for "real time video" and "streaming", however these approaches neglect some aspects which are contextually important.

Codecs generally encode data using information relative to other reference frames stored in the bit-stream. Although the structure of a video file may be complex and delicate, the process of encoding and decoding a video can be easily broken down into component models and entropy encoding. Motion estimation and motion prediction play a key role in reducing the bits required to encode a video frame. Motion estimation is commonly achieved using fixed size macro-blocks, although some formats such as H.264 adopt an adjustable macro-block approach.

System Overview (0100)

An overview of the present invention system is depicted in FIG. 1 (0100). Here the issue of generating a unique cryptographic key for use in secure communication over a computer communication network (0101) between a host computer system (HCS) (0110) executing software read from a first computer readable medium (0111) and a remote mobile user device (0120) executing software read from a second computer readable medium (0121) is addressed. Central to the establishment of secure communications between the HCS (0110) and the MUD (0120) is the generation of encryption keys that can be used in a variety of encryption algorithms to pass data between the two computing devices (0110, 0120).

Traditionally, absent special purpose hardware, entropy generation within the context of traditional computing environments is a difficult task given the deterministic nature of modern digital computers. The present invention addresses this task by allowing host application software (HAS) (0112) to display non-secure video data (0102) to the MUD (0120) for presentation to the end-user (0122). As part of this non-secure display data (0102) the HAS may request that a crypto API (0113) on the HCS (0110) issue a randomization request (0103) to the MUD (0120) that creates a key generation display (KGD) (0123) presented on the MUD (0120) screen. The end-user (0122) then interacts with the KGD (0123) using a gesture key generation (GKG) application (0124) that tracks random movements (0104) of an application cursor by the end-user (0122) over specific regions of the display to gather pixel information that is then returned to the HCS (0110) as random data (0105) for use by an encryption key generator (EKG) (0114) in the generation of an encryption key used to establish an initial communication vector (ICV) between the HCS (0110) and MUD (0120).

Method Overview (0200)

Figure 2:
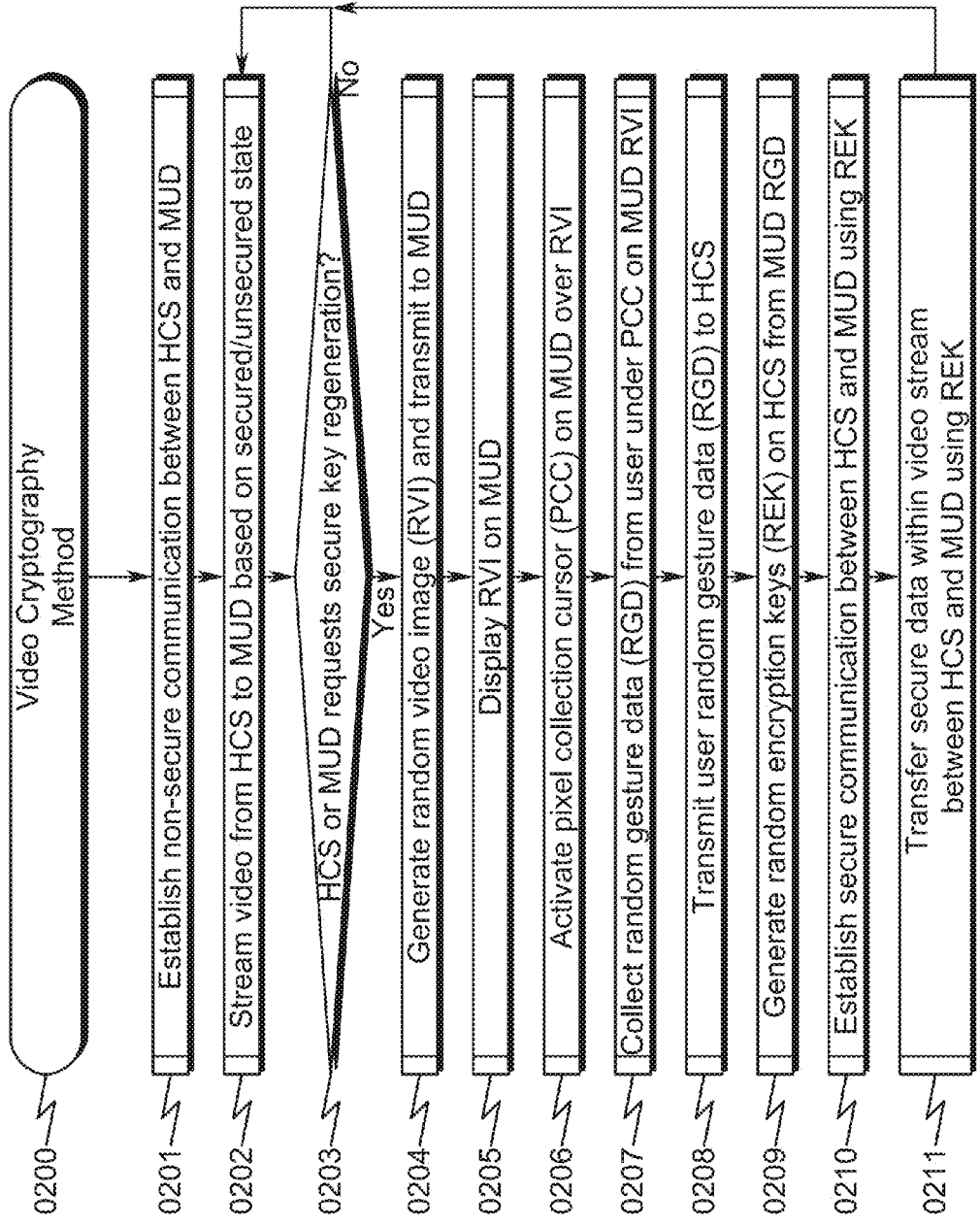
FIG. 2 illustrates an overview flowchart depicting a preferred exemplary invention method embodiment.

An exemplary present invention method can be generally described in the flowchart of FIG. 2 (0200) as incorporating the following steps:

(1) Establishing non-secure communication between a host computer system (HCS) and mobile user device (MUD) through a computer communication network (CCN) (0201);
(2) Streaming video media content (VMC) from the HCS to the MUD based on the current security state (secured/unsecured) (0202);
(3) Determining if the HCS or the MUD has requested secure key regeneration, and if not, proceeding to step (2) (0203);
(4) Generating a random video image (RVI) and transmitting the RVI to the MUD (0204);
(5) Displaying the RVI on the MUD (0205);
(6) Activating a pixel collection cursor (PCC) on the MUD and positioning the PCC over the RVI (0206);
(7) Collecting random gesture data (RGD) from an end-user interacting with the MUD to manipulate the PCC to select RVI pixels under the PCC on the RVI displayed on the MUD (0207);
(8) Transmitting the RGD to the HCS (0208);
(9) Generating random encryption keys (REK) on the HCS from the RGD received from the MUD (0209);
(10) Establishing secure communication between the HCS and the MUD using the REK (0210); and
(11) Transferring secure data within a video stream between the HCS and the MUD using the REK and proceeding to step (2) (0210).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System Detail (0300)

Figure 3:
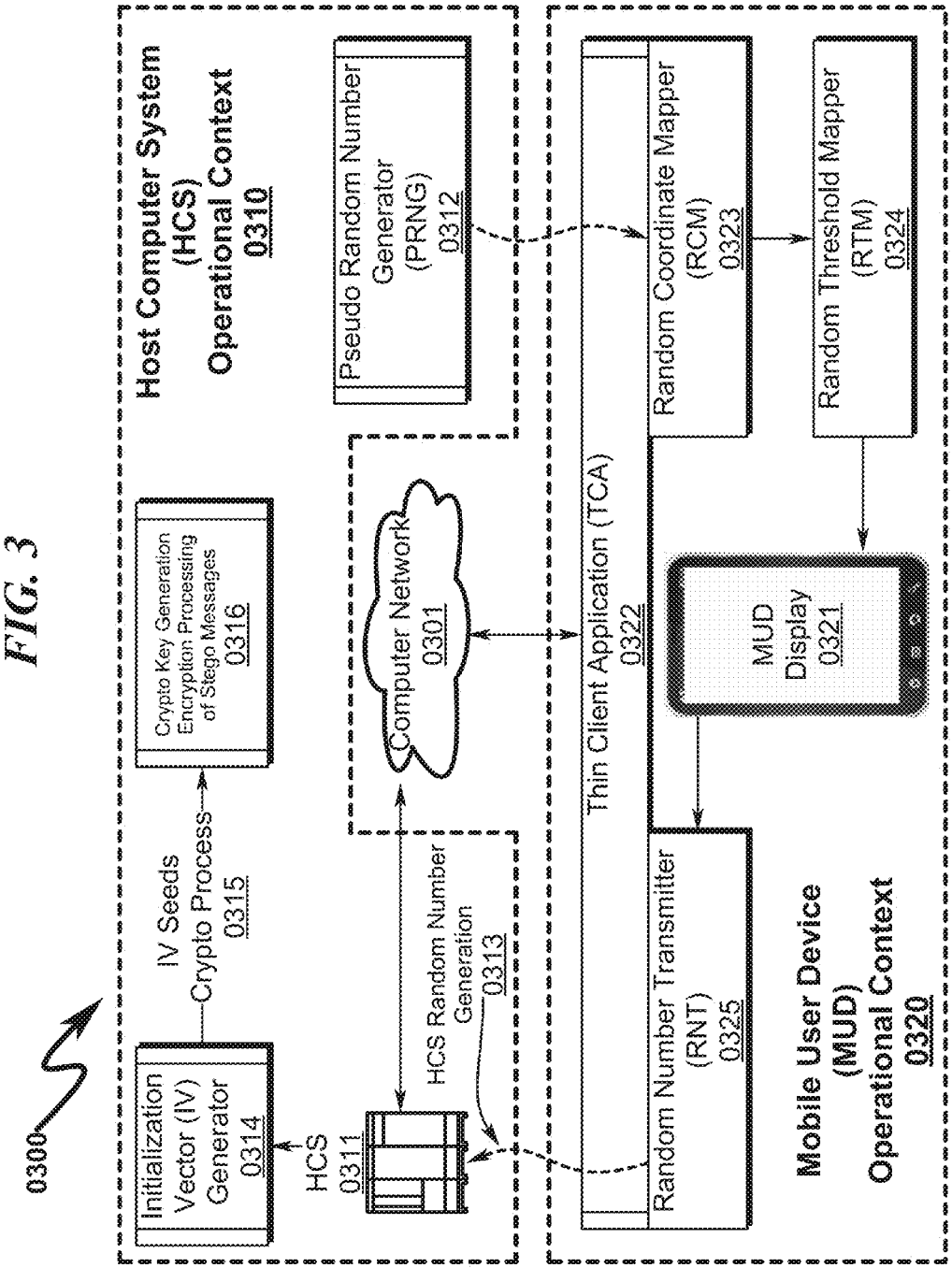
FIG. 3 illustrates a detailed system block diagram depicting a preferred exemplary invention system embodiment.

Additional detail of an exemplary invention system embodiment is depicted in FIG. 3 (0300). Here a HCS operational context (0310) communicates with a MUD operational context (0320) over a computer network (0301). The HCS operational context (0310) comprises a host computer system (HCS) (0311) that generates a pseudo random number (PNRG) (0312) transmitted to a remote MUD (0321) via a thin client application (TCA) (0322). The TCA incorporates a random coordinate mapper (RCM) (0323) that generates a pixelized display on the MUD (0321) using the PNRG data and information from a random threshold mapper (RTM) (0324). This combination of visual data on the MUD (0321) allows capturing of random mouse or other user input into the MUD (0321) for use by a random number transmitter (RNT) (0325) that sends back high entropy random data to the HCS (0311). The HCS (0311) uses this information as a seed for a random number generator (0313) to generate an initialization vector (IV) (0314) that seeds the crypto progress (0315) and is used as the basis for cryptographic key generation and message transmission (0316).

IV Generation Detail Method (0400)

Figure 4:
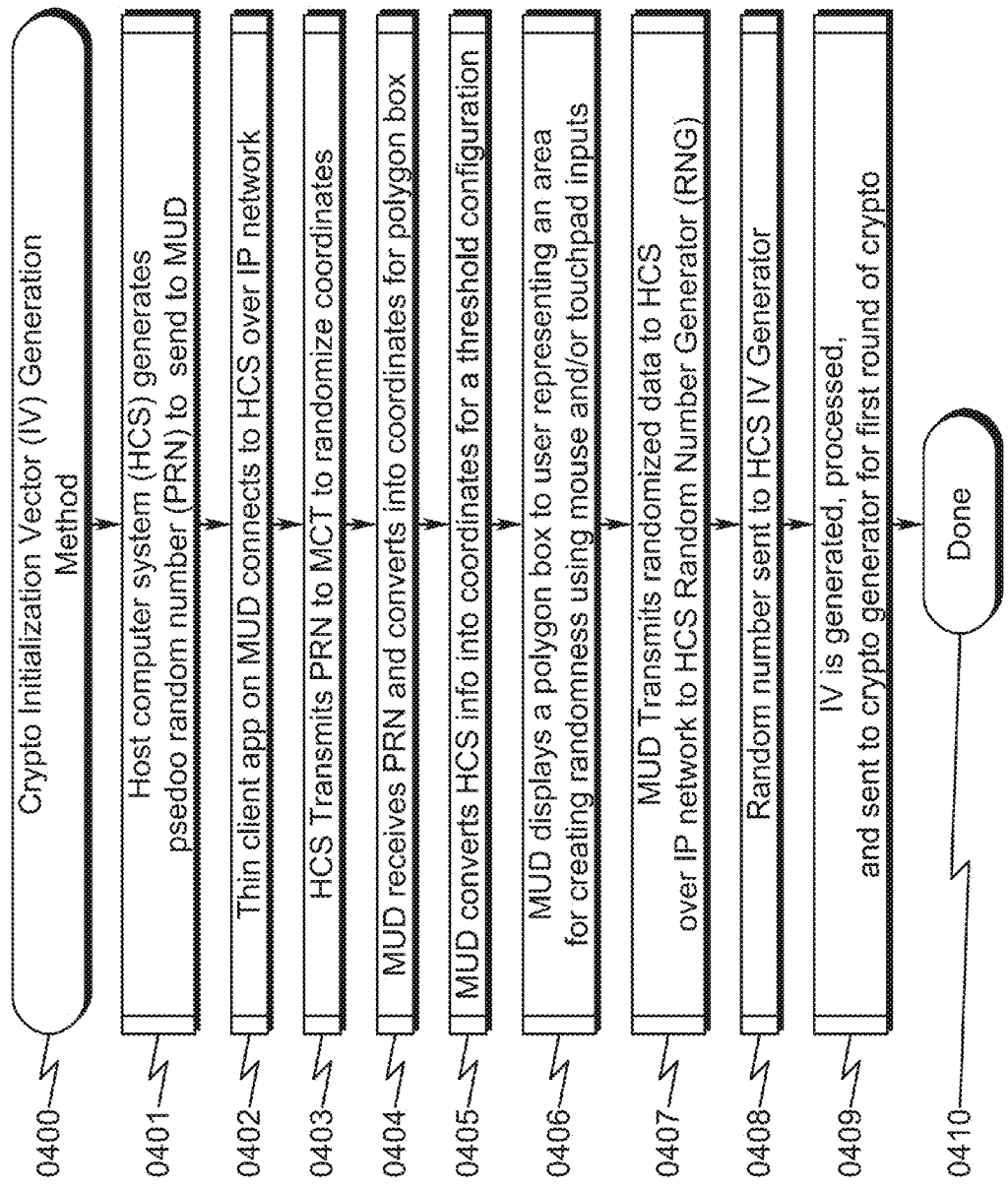
FIG. 4 illustrates a detailed flowchart depicting a preferred exemplary invention method embodiment.

Additional detail associated with operation of the system described above is provided in the initialization vector detail method flowchart of FIG. 4 (0400). An exemplary present invention detail method can be generally described in the flowchart of FIG. 4 (0400) as incorporating the following steps:

(1) Host computer system (HCS) generates pseudo random number (PRN) to send to MUD (0401);
(2) Thin client app on MUD connects to HCS over IP network (0402);
(3) HCS Transmits PRN to MCT to randomize coordinates on MUD (0403);
(4) MUD receives PRN and converts into coordinates for polygon box on MUD display (0404);
(5) MUD converts HCS info into coordinates for a threshold configuration on MUD display (0405);
(6) MUD displays a polygon box to user representing an area for creating randomness using mouse and/or touchpad inputs (0406);
(7) MUD Transmits randomized data to HCS over IP network to HCS Random Number Generator (RNG) (0407);
(8) Random number sent to HCS IV Generator (0408); and
(9) IV is generated by HCS and processed/sent to crypto generator for first round of crypto (0409).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Secure Communication Method Detail (0500)-(0800)

Figure 5:
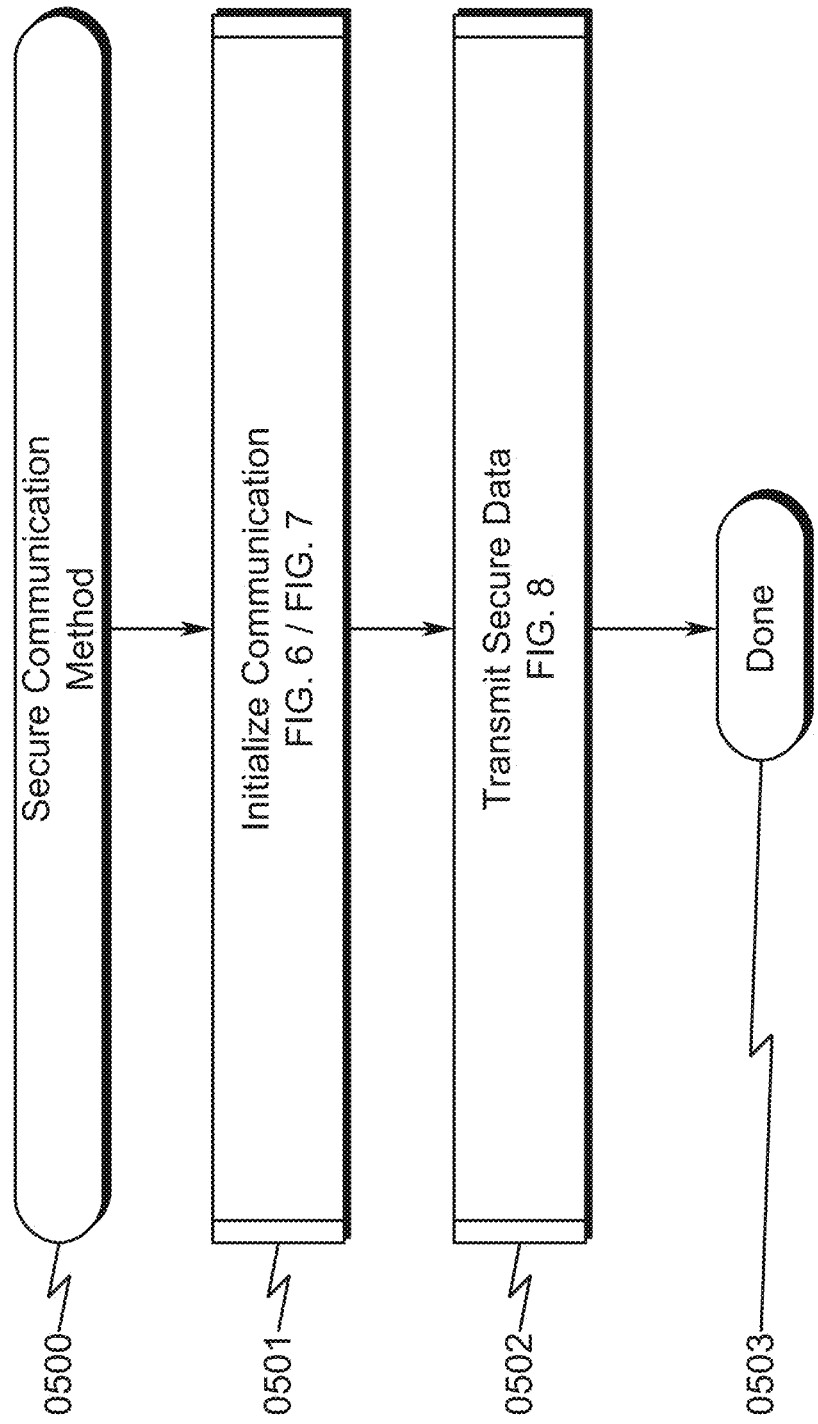
FIG. 5 illustrates an overview flowchart depicting a secure communication channel using the present invention method with Diffe Hellman encryption.
Figure 8:
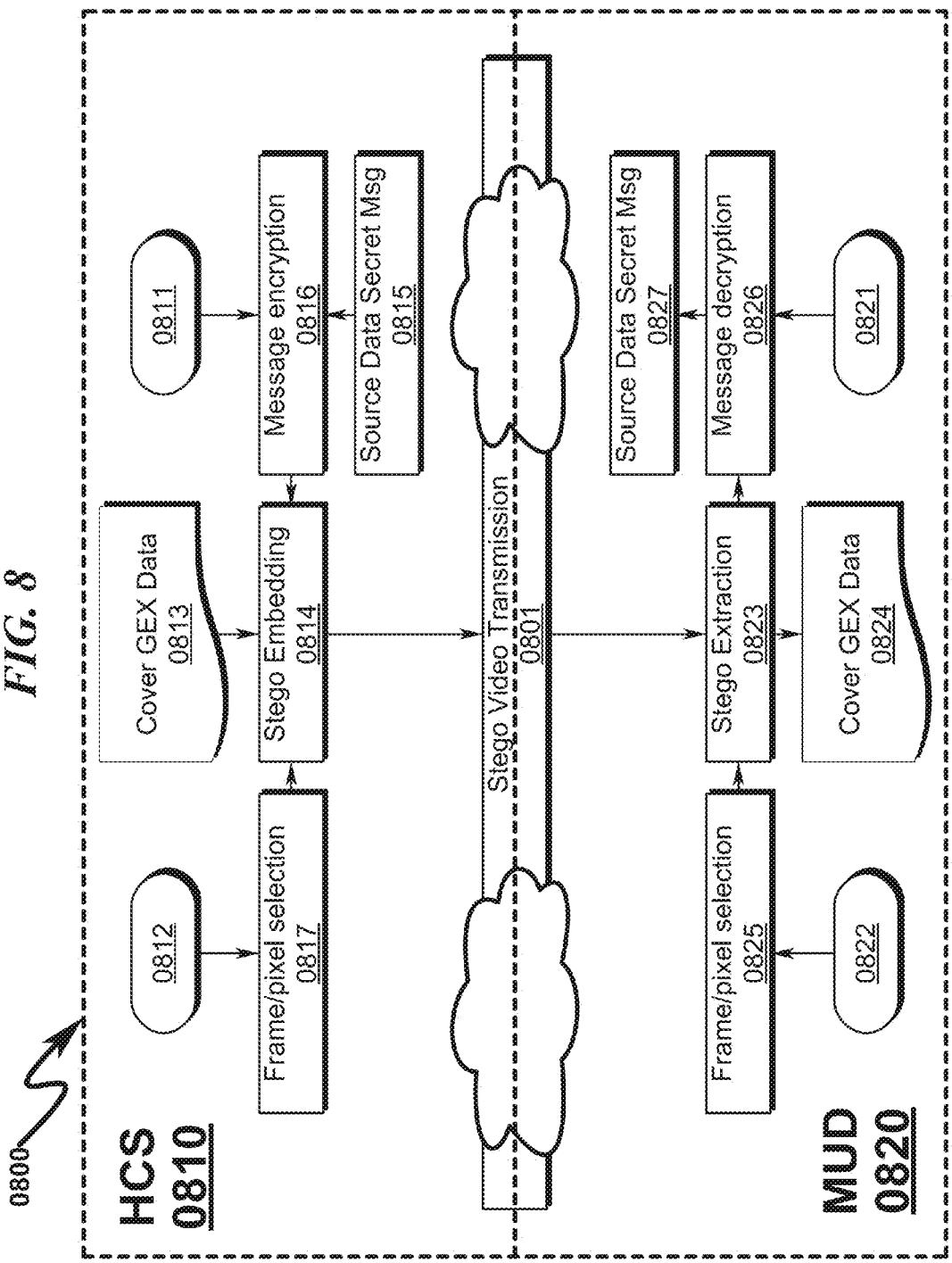
FIG. 8 illustrates a detailed flowchart depicting a secure communication channel data communication process process using the present invention method with Diffe Hellman encryption.

A detailed flowchart describing the operation of the present invention in the context of establishing and maintaining a secure communication channel is depicted in FIG. 5 (0500)-FIG. 8 (0800). The overview flowchart of FIG. 5 (0500) indicates that initialization (0501) and transmission (0502) steps comprise the general method. Here is can be observed that communication initialization must occur before the steganographic communication transmission.

Figure 6:
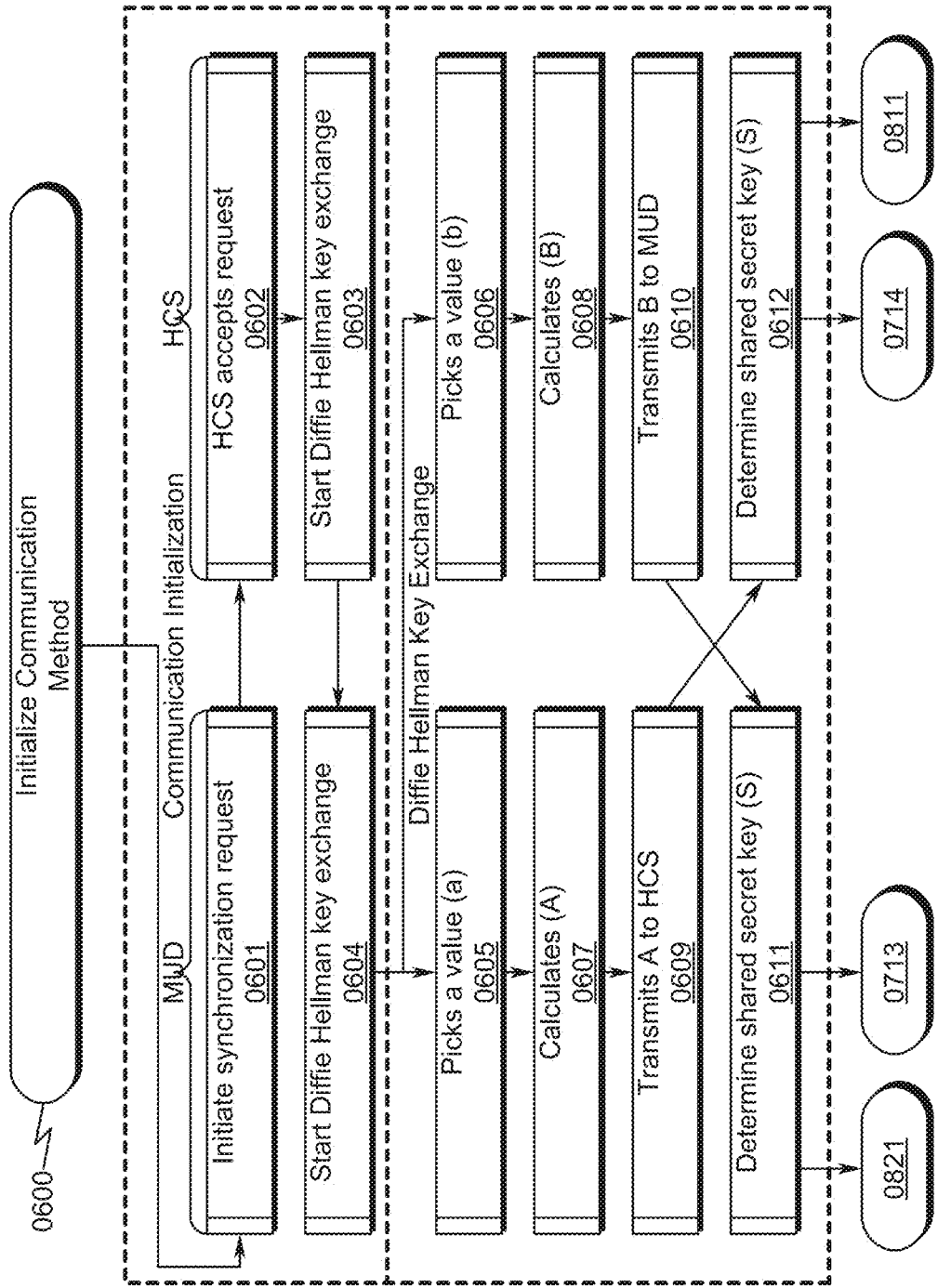
FIG. 6 illustrates a detailed flowchart depicting a secure communication channel initialization process using the present invention method with Diffe Hellman encryption (1 of 2)
Figure 7:
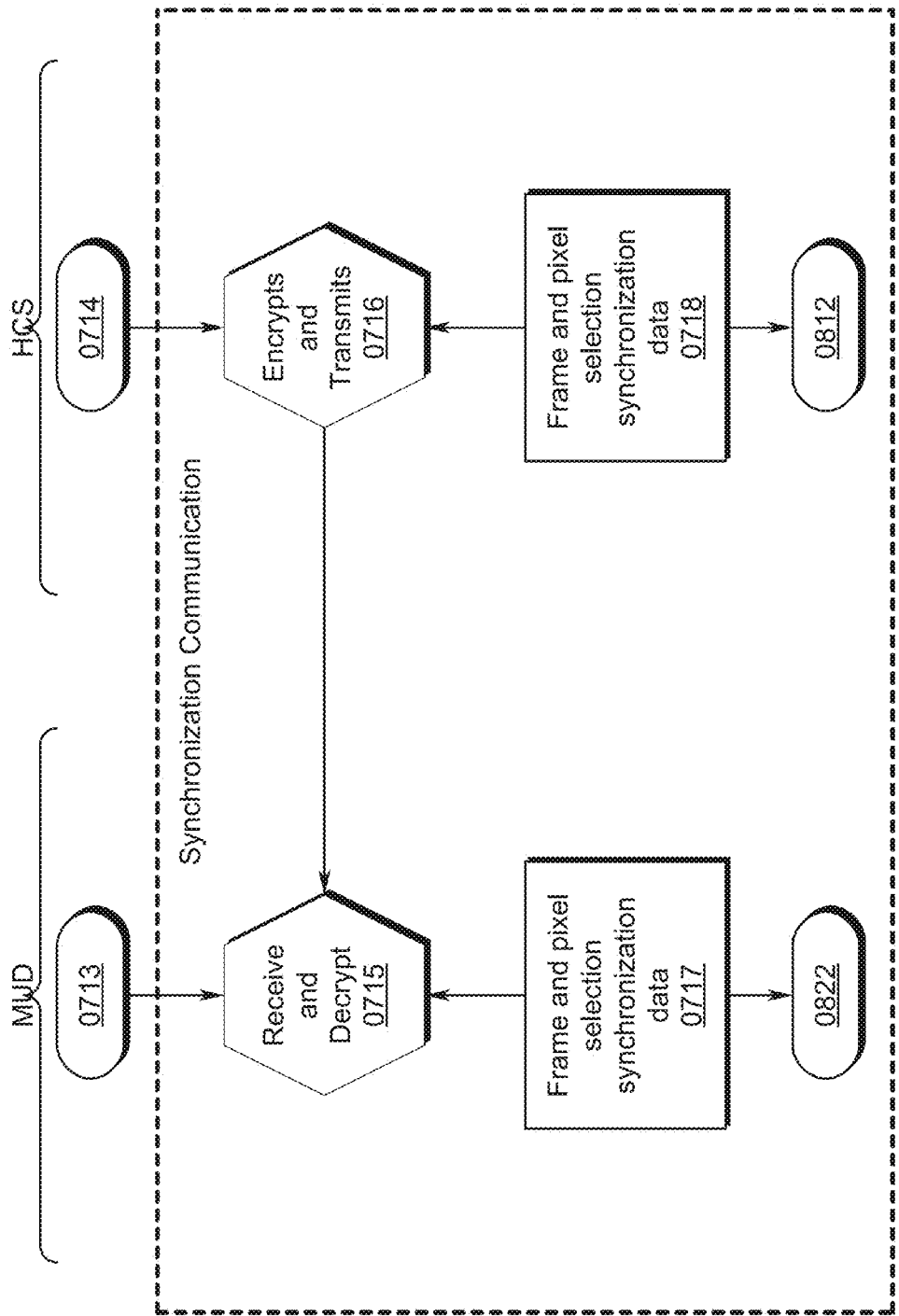
FIG. 7 illustrates a detailed flowchart depicting a secure communication channel initialization process using the present invention method with Diffe Hellman encryption (2 of 2)

Key to the overall system operation is the initialization phase that is detailed in FIG. 6 (0600) and FIG. 7 (0700). The synchronization module (0601) is used to synchronize the HCS and MUD in this communication system and incorporates the generation of random numbers by a cooperating HCS and MUD and follows with an exemplary key exchange (FIG. 6 (0600)) and frame/pixel synchronization (FIG. 7 (0700)).

Once initialization is completed, secure transmission between the HCS and MUD can occur as depicted in FIG. 8 (0800). Note that the source HCS (0810) cover GEX data (0813) can incorporate embedded source data (0815) that is encrypted (0816) and incorporated within a particular frame/pixel selection (0817) as determined by the stego insertion information. Decryption of the transmitted data by the MUD (0820) begins with stego extraction (0823) which emits the cover GEX data (0824). A frame/pixel selection block (0825) selects data that is passed to a message decryption block (0826) to generate the source message plaintext (0827).

Communication Initialization

An overview of the communication initialization architecture is generally depicted in FIG. 6 (0600)-FIG. 7 (0700). Here is can be observed initialization communication begins a process that creates a secure connection between the host computing system (HCS) and the mobile computing device (MCD). The process begins when the MCD sends a synchronization request to the HCS, and the HCS processes the request and begins a Diffie Hellman key exchange communication (DHKE) between the HCS and the MCD. The DHKE results in a securely shared MCD key and HCS key. In synchronization communication the MCD and HCS communicate to produce frame and pixel selection synchronization data (FPSD) on the HCS. The FPSD is encrypted with the Diffie Hellman HCS key and transmitted to the MCD. The FPSD is received and decrypted with the Diffie Hellman MCD key on the MCD.

Communication Transmission

The communication initialization method in FIG. 6 (0600)-FIG. 7 (0700) has four key results that are necessary for steganographic communication transmission (SCT) as generally depicted in FIG. 8 (0800):

The DHKE results in a securely shared MCD key and HCS key, which in addition to the previously mentioned use of encrypting and decrypting the FPSD in synchronization communication are also used in the later SCT. This secondary use of the MCD & HCS keys is depicted in the FIG. 6 (0600)-FIG. 8 (0800) using the reference tags (0811, 0812).

The synchronization communication results in shared FPSD on the HCS and MCD which are used in SCT. This secondary use of the MCD & HCS FPSD is depicted in the FIG. 6 (0600)-FIG. 8 (0800) using the reference tags (0821, 0822).

During the SCT, the secret key is encrypted on the HCS using the shared HCS key resulting in the encrypted message. The HCS FPSD is used to produce a frame and pixel selection algorithm (HCS FPSA). The encrypted message is embed into the cover GEX data according to the HCS FPSA, producing the steganographic video transmission (SVT).

The SVT is transmitted to the MCD where the encrypted message is extracted from the cover GEX data according to the MCD FPSA seeded by the MCD FPSD. The encrypted message is then decrypted using the MCD key revealing the secret message.

Transmission Synchronization Method (0900)

Figure 9:
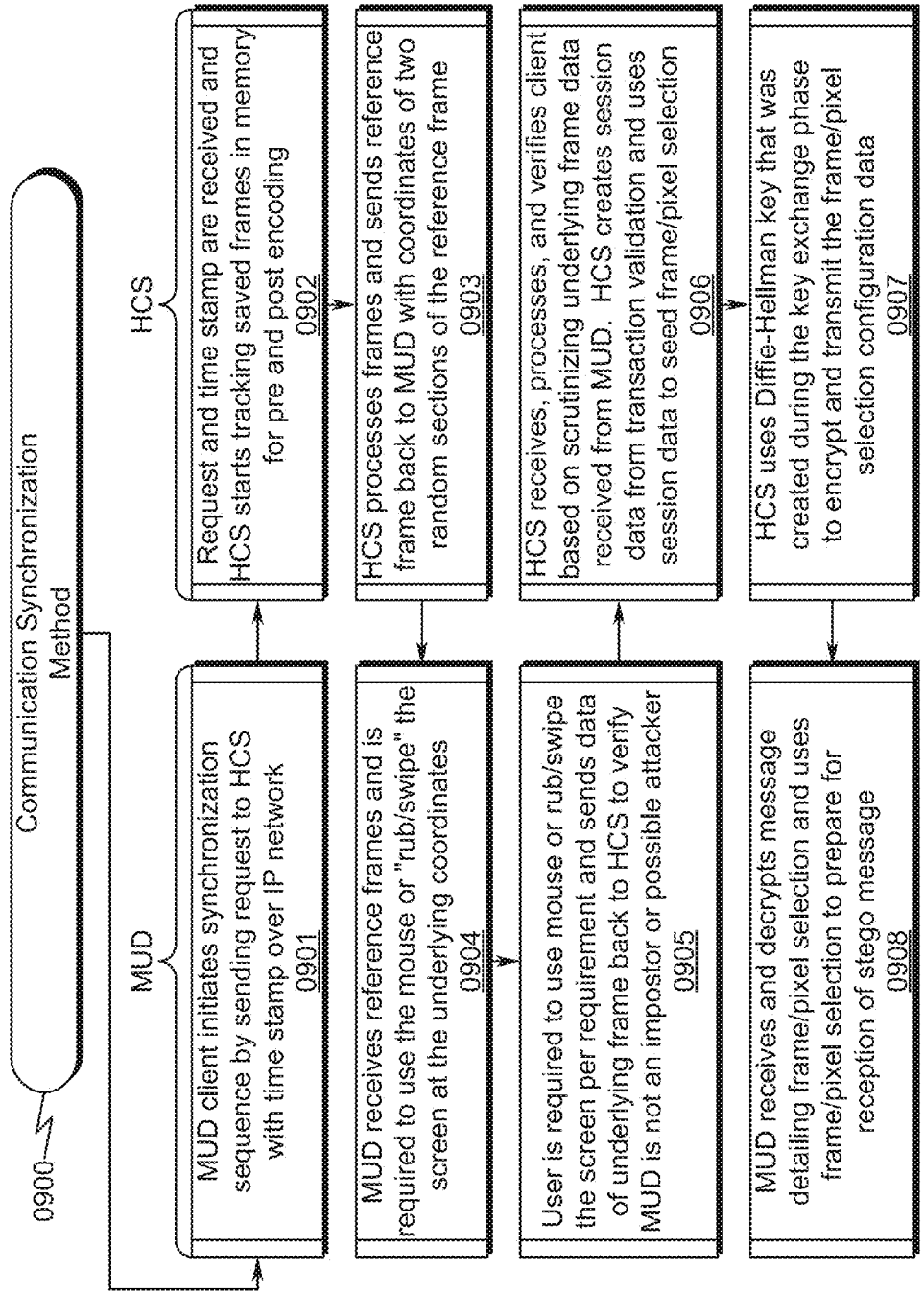
FIG. 9 illustrates a flowchart depicting a preferred communication synchronization method useful in many preferred invention embodiments.

Periodically the HCS and MUD will be required to resynchronize their secure data streams. This requires a handshaking between the HCS and MUD. An exemplary present invention transmission synchronization process can be generally described in the flowchart of FIG. 9 (0900) as incorporating the following steps:

(1) MUD client initiates synchronization sequence by sending request to HCS with time stamp over IP network (0901);
(2) Request and time stamp are received by HCS and HCS starts tracking saved frames in memory for pre and post encoding (0902);
(3) HCS processes frames and sends reference frame back to MUD with coordinates of two random sections of the reference frame (0903);
(4) MUD receives reference frames and is required to use the mouse or "rub/swipe" the screen at the underlying coordinates (0904);
(5) User is required to use mouse or rub/swipe the screen per requirement and sends data of underlying frame back to HCS to verify MUD is not an impostor or possible attacker (0905);
(6) HCS receives, processes, and verifies client based on scrutinizing underlying frame data received from MUD.

HCS creates session data from transaction validation and uses session data to seed frame/pixel selection (0906);

(7) HCS uses Diffie-Hellman key that was created during the key exchange phase to encrypt and transmit the frame/pixel selection configuration data (0907); and (8) MUD receives and decrypts message detailing frame/pixel selection and uses frame/pixel selection to prepare for reception of steganographic message (0908).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Key Transmission Method Overview (1000)-(1100)

Figure 10:
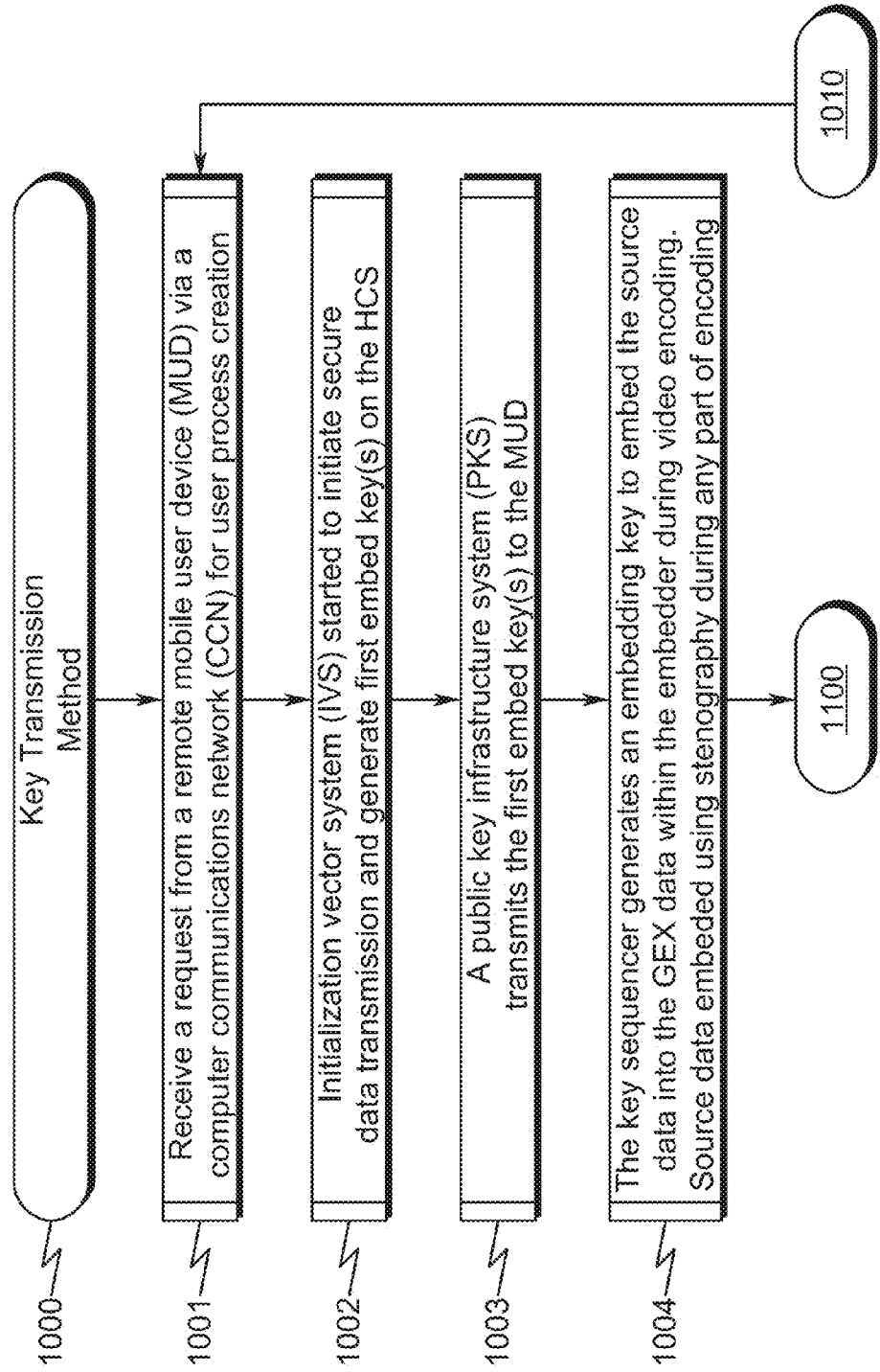
FIG. 10 illustrates a flowchart depicting a key transmission method useful in many preferred invention embodiments (page 1 of 2)
Figure 11:
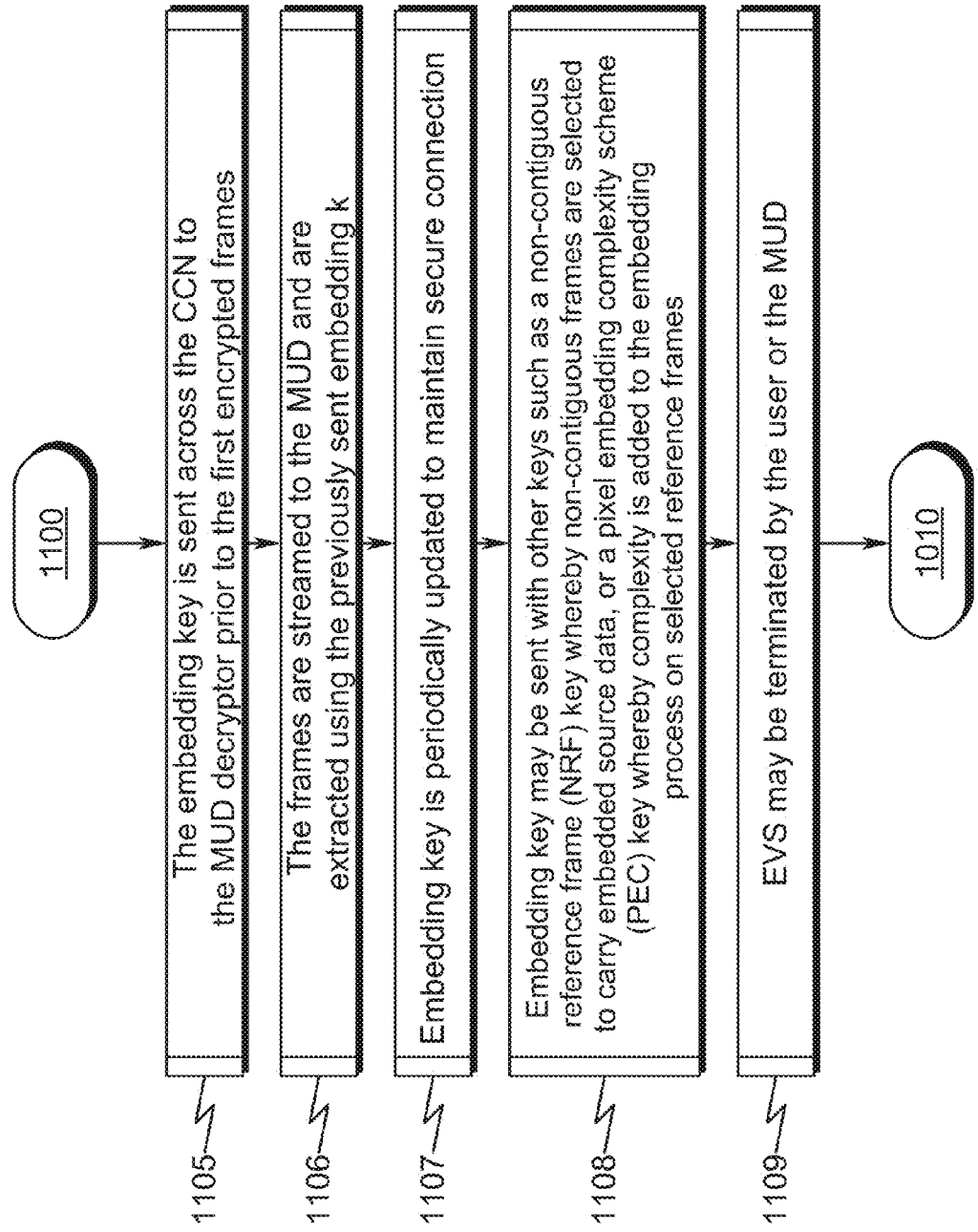
FIG. 11 illustrates a flowchart depicting a key transmission method useful in many preferred invention embodiments (page 2 of 2)

The present invention anticipates that a variety of encryption keys will be transferred between the HCS and the MUD to secure the communication link between these two system components. An exemplary present invention key transmission method can be generally described in the flowcharts of FIG. 10 (1000)-FIG. 11 (1100) as incorporating the following steps:

(1) Receiving a request from a remote mobile user device (MUD) via a computer communications network (CCN) for user process creation (1001);

(2) Initialization vector system (IVS) started to initiate secure data transmission and generate first embed key(s) on the HCS (1002);

(3) A public key infrastructure system (PKS) transmits the first embed key(s) to the MUD (1003);

(4) The key sequencer generates an embedding key to embed the source data into the GEX data within the embedder during the video encoding process. The source data can be embed using stenography during any part of the encoding (1004);

(5) The embedding key is sent across the CCN to the MUD decryptor prior to the first encrypted frames (1105);

(6) The frames are streamed to the MUD and are extracted using the previously sent embedding key (1106);

(7) The embedding key is periodically updated to maintain a secure connection (1107);

(8) The embedding key could also be sent with other keys such as a non-contiguous reference frame (NRF) key whereby non-contiguous frames are selected to carry embedded source data, or a pixel embedding complexity scheme (PEC) key whereby complexity is added to the embedding process on selected reference frames (1108);

(9) The EVS may be terminated by the user or the MUD (1109) and processing continues in step (1).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Exemplary Diffie Hellman Key Exchange (1200)

Figure 12:
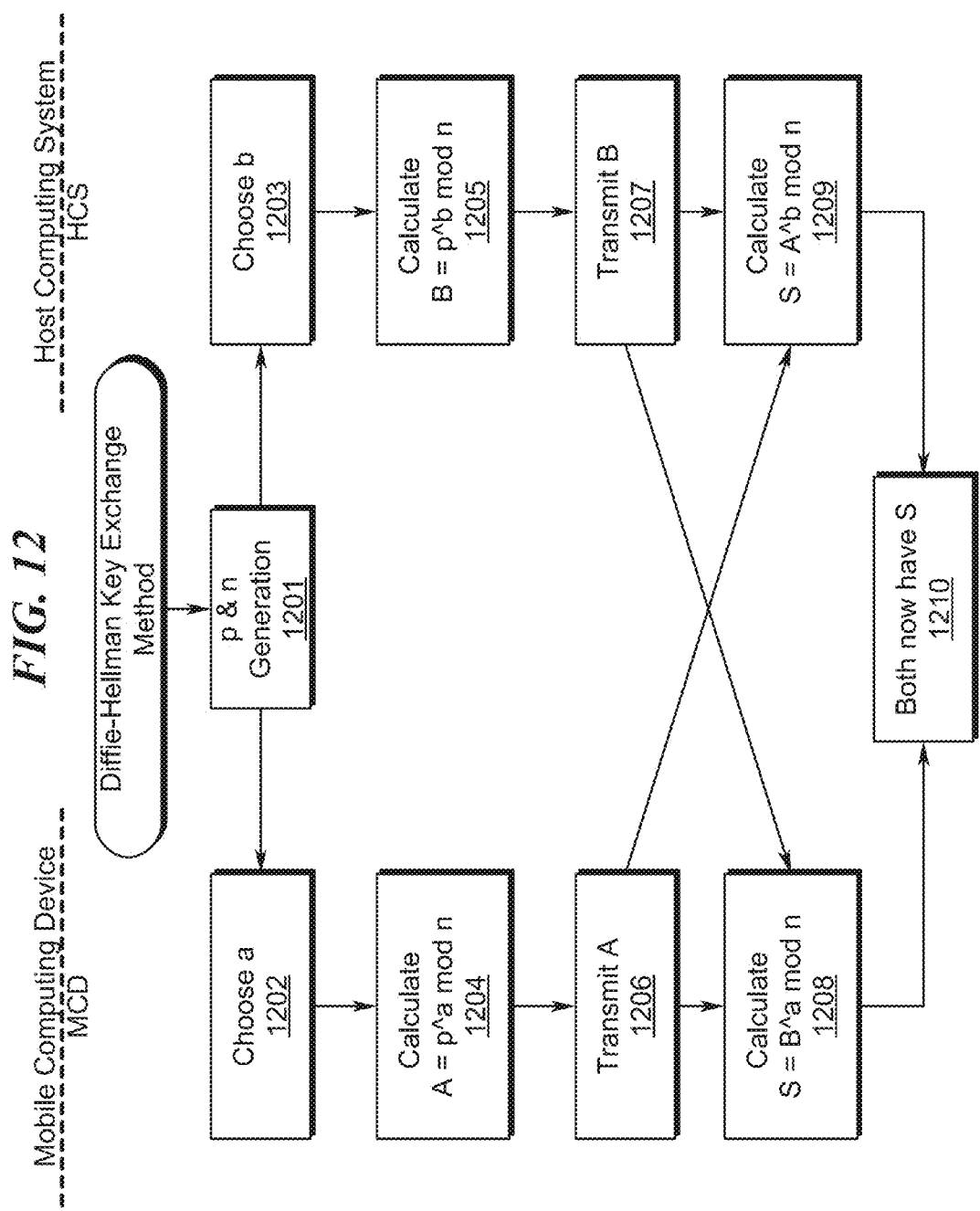
FIG. 12 illustrates a flowchart depicting the Diffe Hellman key exchange method useful in many preferred invention embodiments.

The present invention anticipates that the Diffie Hellman key exchange protocol depicted in FIG. 12 (1200) may be used to exchange encryption keys between the HCS and MUD after randomization information is generated by the MUD in response to reception of a PNRG bitmap from the HCS.

The Diffie-Hellman key exchange was developed by two mathematicians named Whitfield Diffie and Martin Hellman in the 1970s. The idea behind Diffie-Hellman is to be able to exchange cryptographic keys in a secret manner so that only the two participants will know the keys when the exchange is complete. The idea behind Diffie-Hellman is not to exchange keys directly but for two parties to derive keys based on some shared knowledge, as well as some secret knowledge. While it is called a key exchange algorithm, it's more of a key generation algorithm, developed in such a way that two people can derive keys from pieces of shared and random data.

Any talk about cryptographic keys eventually covers the math involved since digital keys are derived from specific mathematical functions. Diffie-Hellman makes use of modular arithmetic in order to generate the key. Modular arithmetic is when you take the remainder from a division problem. This may be seen as it is expressed as 25 mod 3=1, as an example: 3*8=24 and 25−24=1. In as simple terms as possible, two parties, MUD and HCS, want to communicate with one another. Initially, they select two numbers. The first is a prime number that is called p. The second is a number we called n, which is a primitive root mod p. This means that picking a number g that can be plugged into the following formula and the value of a in the formula is coprime to p, meaning it has no positive factors in common with p other than 1: $p^k=a \pmod{n}$. In other words, taking the set of all integers that are coprime with p and make that set A, running through all values of A as a, you will be able to satisfy the preceding equation with an integer k.

So, MUD and HCS now have their two values p and g. FIG. 12 (1200) shows a representation of the process of creating the shared key. MUD picks a secret value that only she knows, which is called a. She then calculates the following value: $A=p^a \bmod n$. A is then sent to the HCS. Similarly, the HCS picks a secret value that called b and calculates $B=p^b \bmod n$, sending B off to the MUD when the calculation is complete. The key, called s, is then calculated on both sides by MUD computing $s=B^a \bmod n$ and HCS computing $s=A^b \bmod n$. They will both end up with the same value for s, and without exchanging s in any way they have computed a secret value that they can both use as a key for encrypting further communication. This does, however, require that some agreements be made ahead of time, meaning that HCS and MUD have to have been known to one another in order to get the initial numbers in common to begin with, or at least they have to have a trusted third party in common to provide those values. It is this the calculation and transmission of these initial seed values that the present invention addresses.

Exemplary Block Cipher Exchange (1300)-(1400)

Figure 13:
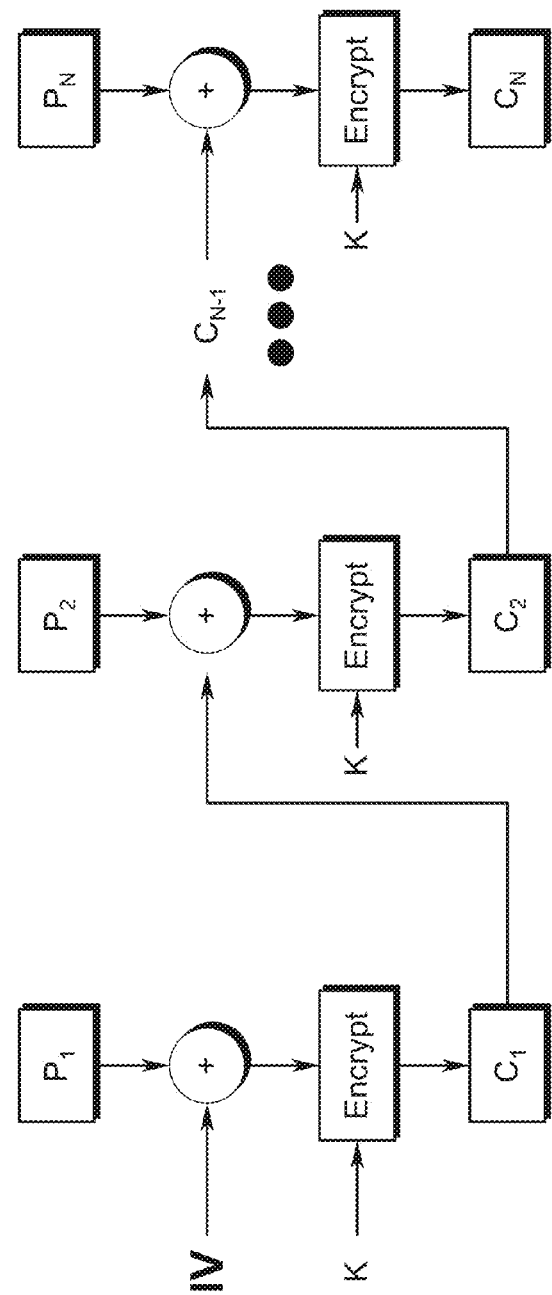
FIG. 13 illustrates a flowchart depicting a block encryption method useful in many preferred invention embodiments.
Figure 14:
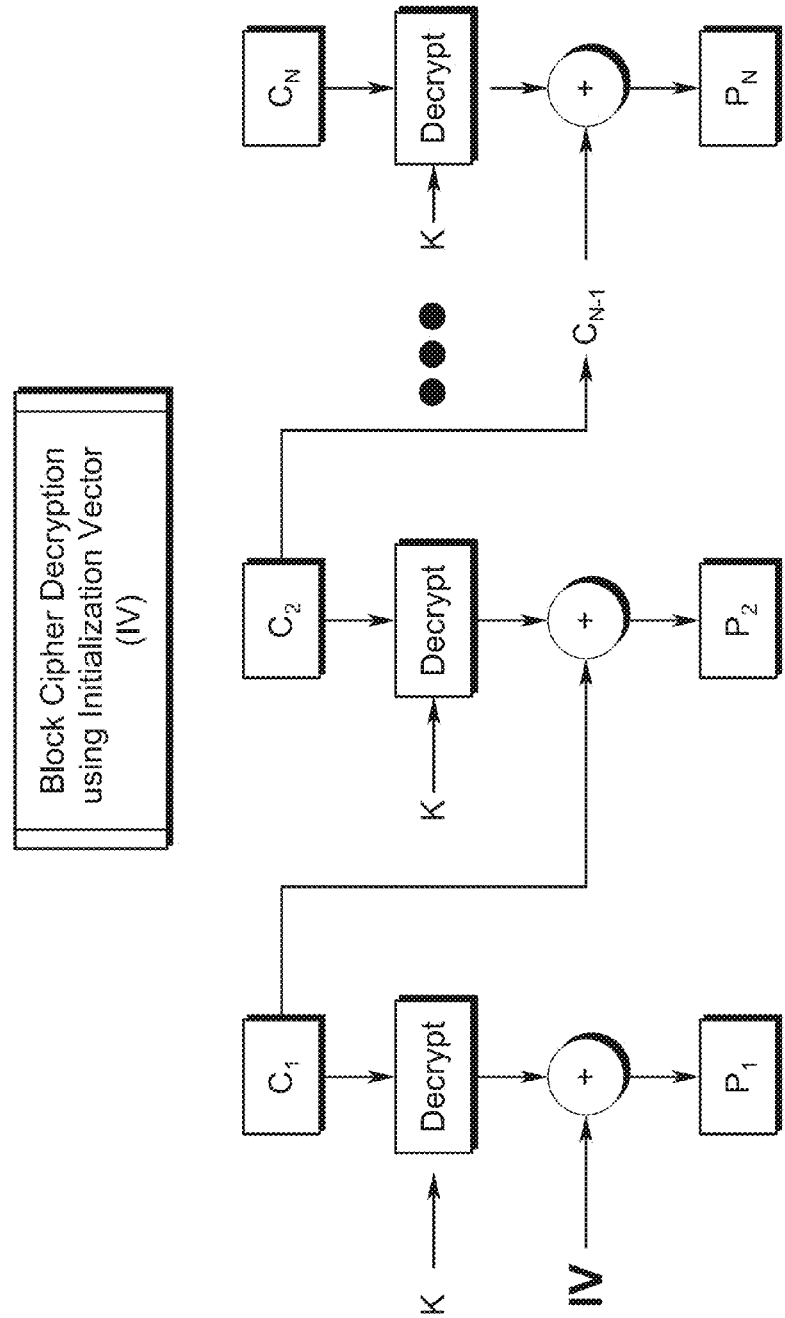
FIG. 14 illustrates a flowchart depicting a block encryption method useful in many preferred invention embodiments.

The present invention anticipates that the block cipher data exchange protocol depicted in FIG. 13 (1300)-FIG. 14 (1400) may be used to exchange secure data between the HCS and MUD after encryption key exchange has occurred. These encryption/decryption flowcharts may be used to encapsulate secure data bidirectionally within the video stream that is sent between the HSC and MUD.

Initialization Vector System (IVS)

Before any reference frame or pixel data may be sent, the initialization vector must be established. A method to securely establish the initialization vector (IV) is discussed below. The IV is use to seed the embed system with initial steganographic keys. In order to sustain security, the system must be capable sending multiple keys on a different pattern of synchronization prior to the synchronization pattern for the source data/GEX. That is an encryption key and steganographic key must be synchronized so that they will not interfere with one another.

The client mobile computer (MUD) creates randomness using various types of input from various types of devices or sensors. Random generation is needed for generation of an initialization vector. Where most ciphers requires that the IV be unpredictable. Commonly it is either (a) random or (b) a unique value encrypted by a key or both depending on the requirement. A new method proposed for high-quality random number generation starts with pseudo random number generation from the server (HCS) that creates two randomly generated pieces of spatial information shared with the client for placement of a set of coordinates used by the client as a confined space for which to create randomness by gesture with an input device such as a mouse or touch/swipe of mobile screen.

The creation of a high quality unique random number generator for this invention requires three important pieces of information. First, the client creates polygonal area based on the random coordinate information received by the server. The second piece of randomness from the server is also spatial and will be consider a threshold configuration containing random coordinates for another polygon that will be confined within the first set of coordinates that may be utilized to maintain high quality gestures for randomness where each gesture must at least touch or pass through the boundary set by the configuration coordinates. A third piece of information required for the high-quality random generator is temporal where the user will be required to create random gestures over a period of time.

It is highly improbable that a series of random (x, y) vectors or a series of coordinates from the trace of mouse trajectory or swipe movements over a period of time can be exactly recreated or predicted.

Other embodiments of this invention may use other types of inputs from a mobile computer that contains sensor devices that may be used, but not limited to performing gestures, capturing pressure information, motion detection, triple axis accelerometer information, locational information, or human wearable sensor information collection. These pieces of information from the devices can be used separately or any combination therein to provide inputs to a random number generator.

The client computer will transport the randomness as bits of information to the server over an IP network where the server will then process the random input received from the client. The server will create an Initialization Vector for which to seed an initial round of crypto from which public and private keys may be created for distribution within the system.

The crypto keys may be shared using modern techniques for maintaining confidentiality using digital certificates. The keys or certificates may be shared in the system steganographically after they have been encrypted or otherwise.

Self Regulated Indefinite Stream System (SRIS)

The concept of real-time steganography in video streaming is meant to provide a mechanism to protect private multimedia data that are exchanged over an IP network(s). Steganography is the technology that hides secret or private data into a carrier in an invisible or undetectable manner where only the communicating parties are aware of the existing hidden data.

The use of cover data as a carrier for hiding secret payloads in the digital realm currently exist using images, video, text files, and audio. The methods used for hiding the data primarily use fixed length files using spatial algorithms to inject or append data within the multimedia. In video streaming steganography, a video data file is used as cover data for embedding a secret message. The current method by which secret data is embedded into a video stream also relies on a fixed length video file.

An exemplary embodiment of a new invention does not require a fixed length file for processing and embedding hidden information, but may use an open ended continuous video stream using spatial and temporal methods for time and frame indexing and referencing. A method has been developed that provides a better result in terms of providing a more robust cryptographic and steganographic service that will better protect against attack vectors or private/public key transfer. The invention requires a method for self-regulation that can be seed an open ended video broadcast, with multi-dimensional steganography. In contrast with fixed length video file containers, where the start and stop elements are known, with open ended, the start and stop elements are perceived and must be generated within the system to manage synchronization and security.

Differing from traditional steganographic methods, where a secret payload is embedded in a finite multimedia file, the present invention makes use of an open-ended multimedia file transmission that is streamed across the network from the HCS to the MUD. The open-ended multimedia file transmission will secure streams by creating a self-regulated steganographic encryption using a Self-Seeding Embedding Key System (SEK). In order to sustain security, the system must be capable sending multiple keys on a different pattern of synchronization prior to the synchronization pattern for the source data/GEX. That is and encryption key and steganographic key must be synchronized so that they will not interfere with one another.

The embedding key could also be sent with other keys such as a non-contiguous reference frame (NRF) key whereby non-contiguous frames are selected to carry embedded source data, or a pixel embedding complexity scheme (PEC) key whereby complexity is added to the embedding process on selected reference frames.

A frame sends an embedded steganographic key(s) within the already encrypted video stream periodically. The periodicity is determined by a changing algorithm at the steganographic embedder (STE). The steganographic keys contain reference frame data that decrypts only selected frames arriving after the key. The key may even contain reference data that delays the keys decryption for a set number of frames, a static periodicity, a dynamic periodicity, or any other pattern. The delay and pattern for any key would have been established at the steganographic embedder.

A frame selection pattern is instantiated at the embedder. The pattern data (PAD) is embedded in the encrypted video stream (EVS). It carries two pieces of information, (1) the frame delay in which the frame selection pattern will be applied upon decryption and (2) the periodicity of the encrypted frames. The periodicity may be programmed to be static or dynamic. Once the frame selection pattern data has been embedded in the EVS, it must also be applied at the embedder.

Within a referenced frame, the invention requires another reference related to the coordinates of underlying pixels. The pixel reference must also be included in the PAD and applied at the embedder.

Bi-Directional Encrypted Data Transfer

The present invention may include methodologies to embed secure information into a hidden video stream to support bidirectional transfer of data between a mobile device and a host computer. This component is useful in supporting secure communications between remote devices and host computer applications and may be used in credit card and other banking transactions by embedding a secure data stream within the video content transmitted within video content to the host computer as needed using this cryptographic protocol to ensure that the data is maintained securely across both machines. Provisions within this protocol for biometric data transfer to the host computer for personal identification are also anticipated. Thus, the cryptographic protocol is bidirectional in that data may be communicated for the host-to-mobile and visa-versa in a secure manner.

Contrast with the Prior Steganographic Art (1500)-(1600)

Figure 16:
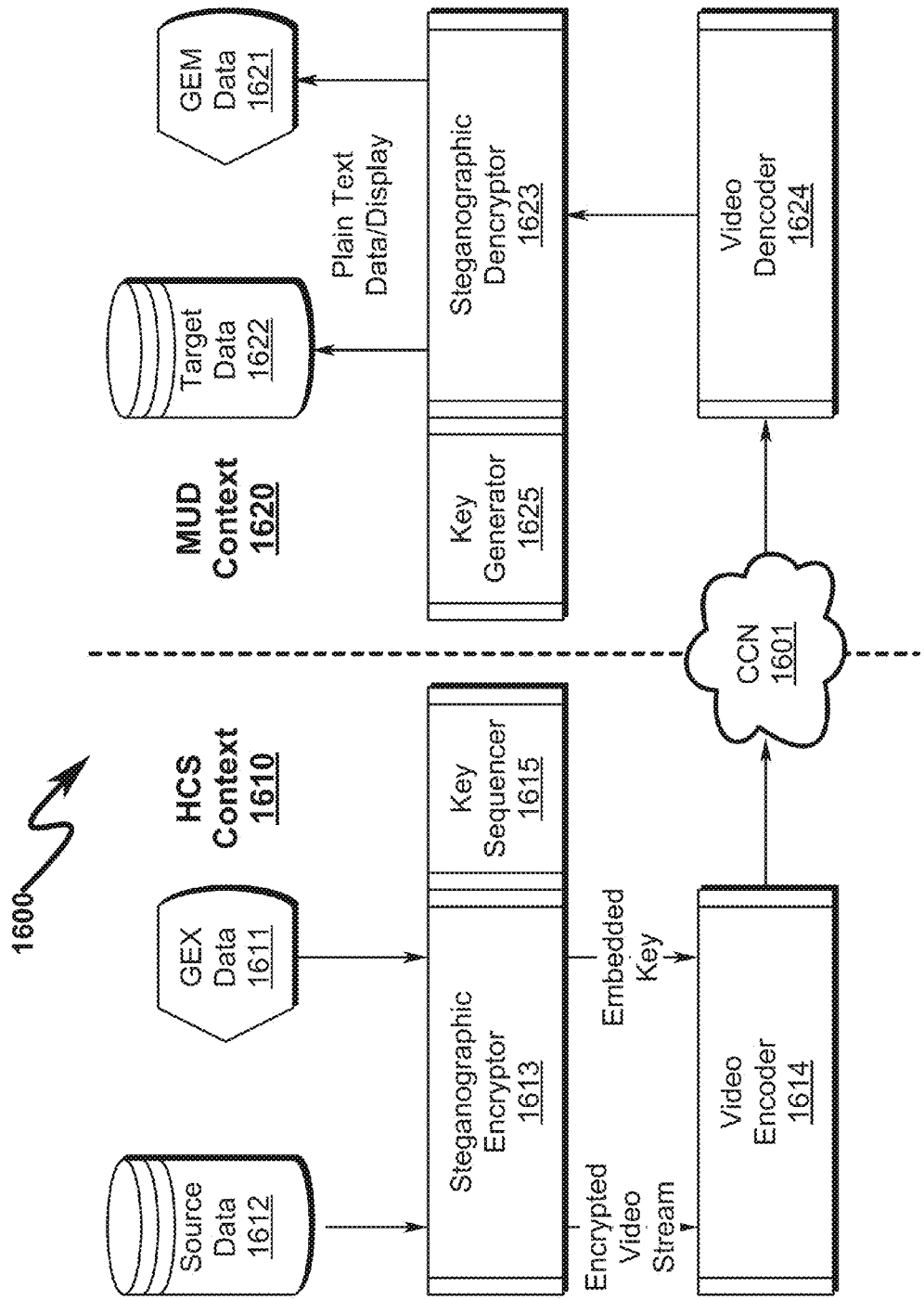
FIG. 16 illustrates an implementation of the present invention as applied to a steganographic encryption system.

A table contrasting the present invention with the prior art is depicted in FIG. 15 (1500) with additional contrasting detail provided in FIG. 16 (1600). FIG. 15 (1500) provides a table illustrating a direct comparison of the present invention to traditional video/multimedia steganographic methods with respect to fundamental steganographic terminology.

A depiction of the present invention as applied to steganographic encryption is generally illustrated in FIG. 16 (1600) wherein the anticipated use of steganography in conjunction with encryption permits the merging of both GEX display data (1611) and source data files (1612) within an encryption process (1613) operating in the HCS context (1610) to form a merged video data stream comprising both an encrypted video stream as well as an optional embedded key. This merged video information is then input to a video encoder (e.g., MPEG encoder) and transmitted via the CCN (1601) to a video decoder (1624) operating in the MCD context (1620). The video decoder (1624) regenerates the video stream and this video stream is then run through a steganographic decryption process (1623) that extracts the GEM display data (1621) and optional target data (1622). The fact that the video encoder (1614) and video decoder (1624) may implement lossy compression/decompression may be used in this process to hide the encryption keys associated with the data transfer and make the decryption of the combined source data and GEX display even more difficult for attacks that rely on tapping the CCN communication link.

Within this context a key generator (1625) may be populated by MCD user inputs from the UEM or GEM modules and be used to populate a key sequencer (1615) that is the basis of the original encryption process (1613). It is significant to note that this process is capable of supporting a number of secure data subchannels within the video stream and thus simultaneously support a number of GEX/GEM displays (1611, 1621) and/or source/target databases (1612, 1622).

The present invention differs from the traditional cryptographic systems incorporating video in that the multimedia cover medium is not of finite size, but is rather and indefinite multimedia stream of HCS GEX data in which secret source data is hidden.

There is a popular model of steganographic encryption that has gained momentum in recent years that incorporates the steganographic encryption into the motion vectors created during the encoding process. The benefits are instead of creating a steganographic encryption process that has to survive compression and decompression through the encoding and decoding processes, the motion vectors output by the temporal stage of encoding and input to the entropy coding avoiding much compression in the spatial stage. The result would be a combination of the steganographic encryption process (1613) and the encoding process depicted in FIG. 16 (1600).

In the context of the novel concept surrounding the merging of both the GEX and source data file within an encryption process, the method with which it is possible to stenographically encrypt the video data stream is not critical. The utilization of steganographic encryption in the present invention is novel for a number of reasons, as shown in the Table provided in FIG. 15 (1500).

This merged video information is then input to a video encoder (e.g., MPEG encoder) and transmitted via the computer communication network (CCN) (1601) to a video decoder (1624) operating in the MCD context (1620). The video decoder (1624) regenerates the video stream and this video stream is then run through a steganographic decryption process (1623) that extracts the graphical experience mapper (GEM) display data (1621) and optional target data (1622). The fact that the video encoder (1614) and video decoder (1624) may implement lossy compression/decompression may be used in this process to hide the encryption keys associated with the data transfer and make the decryption of the combined source data and GEX display even more difficult for attacks that rely on tapping the CCN communication link.

Lossy compression is a very difficult thing for video steganography to overcome. It will be important that we gain more detail on how steganographic encryption/decryption will be implemented into the encoding and decoding processes.

Within this context a key generator (1625) may be populated by MCD user inputs from the UEM or GEM modules and be used to populate a key sequencer (1615) that is the basis of the original encryption process (1613). It is significant to note that this process is capable of supporting a number of secure data sub-channels within the video stream and thus simultaneously support a number of GEX/GEM displays (1611, 1621) and/or source/target databases (1612, 1622).

Random Number Generation (1700)-(2000)

Figure 19:
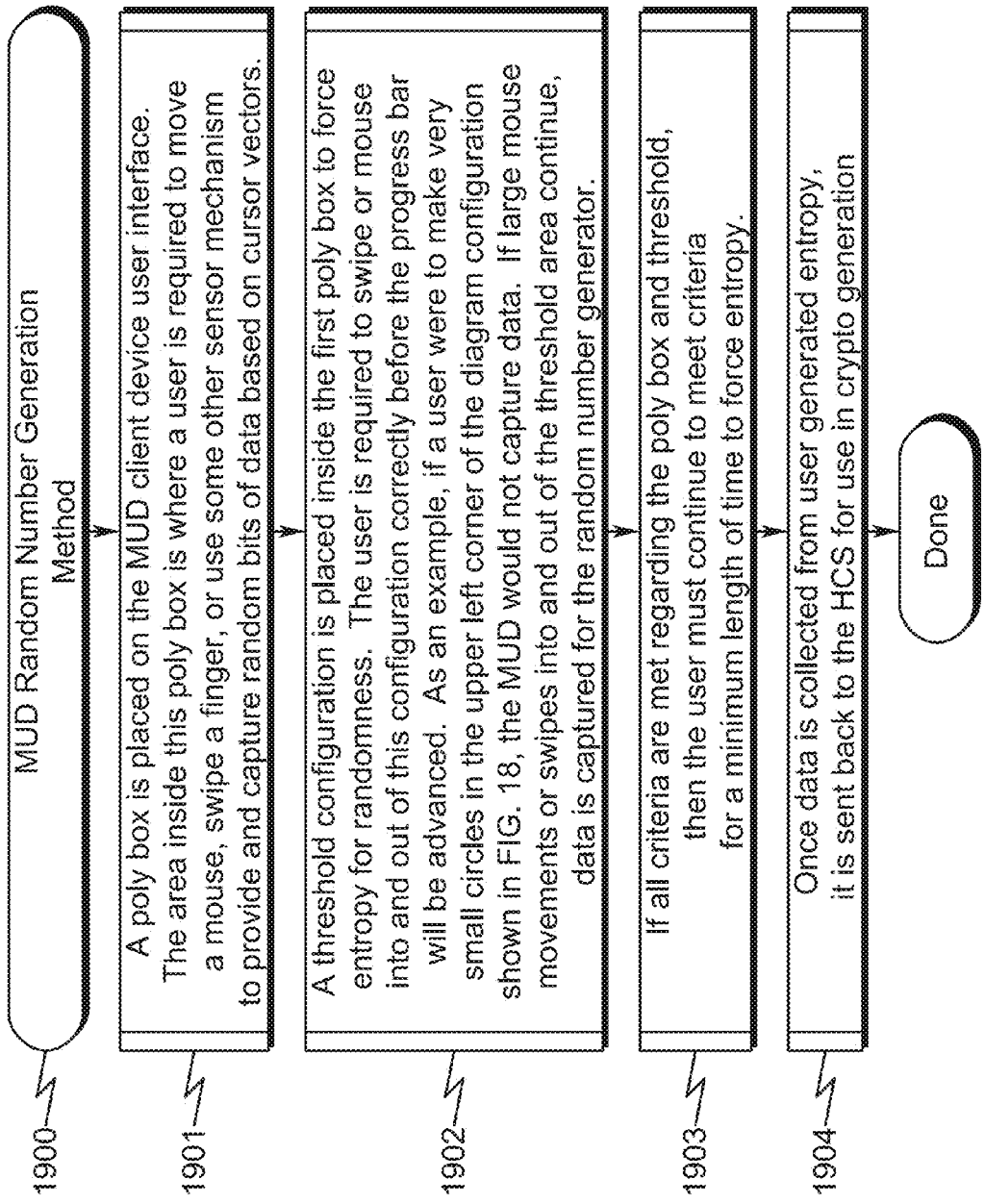
FIG. 19 illustrates a flowchart depicting an exemplary MUD random number method.

Generation of a truly random number with sufficient entropy is an objective of the present invention. An outline of this process as used in the present invention is detailed in FIG. 17 (1700)-FIG. 19 (1900). The process requires cooperation between the HCS and MUD to generate the random number information used to seed the cryptography initialization between the HCS and MUD. Within this context Randomization Generation comprises a random seed (or seed state, or just seed) that is a number (or vector) used to initialize a pseudorandom number generator. The choice of a good random seed is crucial in the field of computer security. When a secret encryption key is pseudo-randomly generated, having the seed will allow an attacker to obtain the key.

The random seed is used to generate the initialization vector (IV) by the HCS. The IV is a sequence of random bytes appended to the front of the plaintext before an encryption block cipher. Adding the initialization vector to the beginning of the plaintext eliminates the possibility of having the initial ciphertext block the same for any two messages. For example, if messages always start with a common header (a letterhead or "From" line), their initial ciphertext would always be the same, assuming that the same cryptographic algorithm and symmetric key were being used. Adding a random initialization vector eliminates this possibility and provides for a stronger form of encryption.

Figure 17:
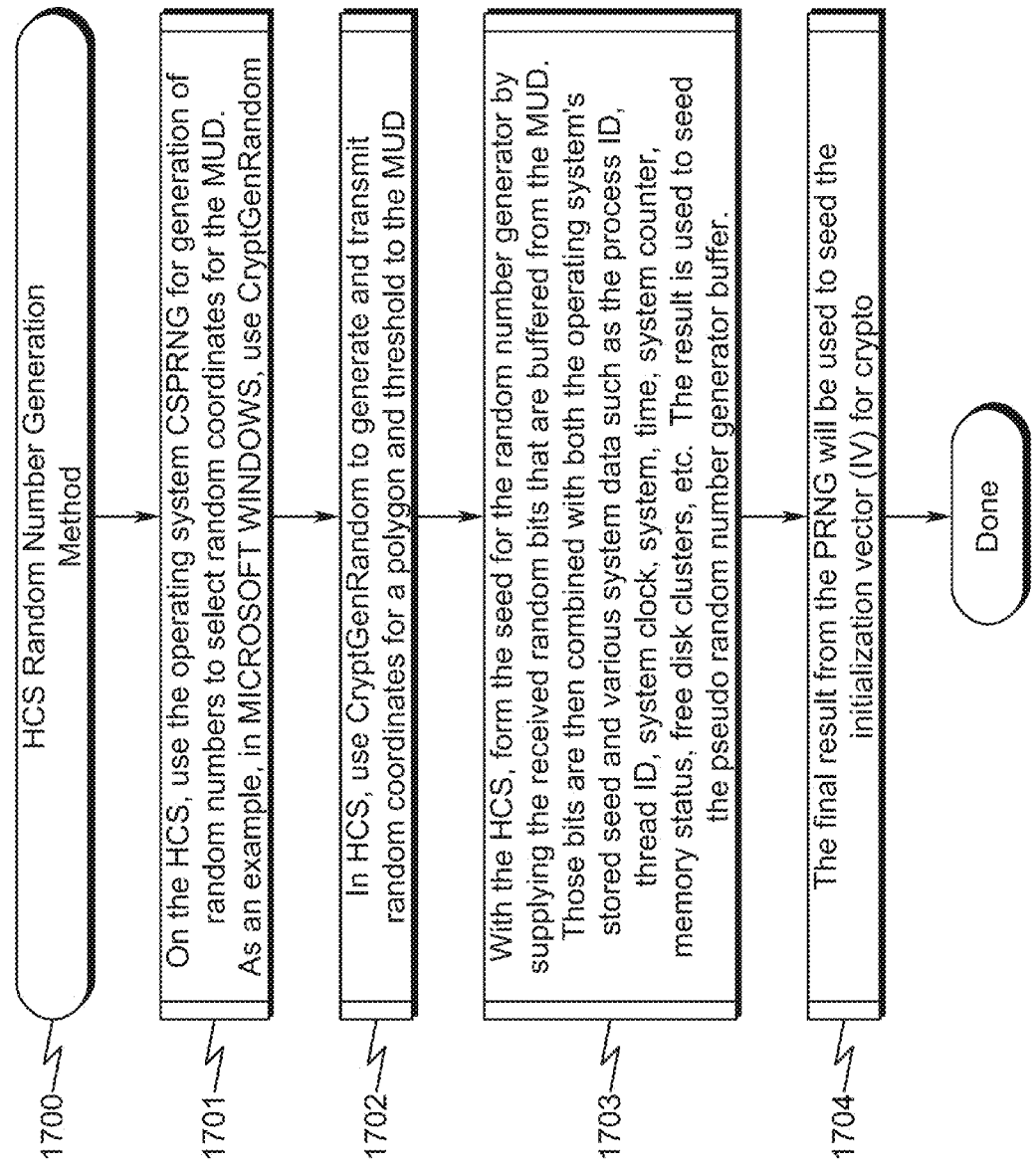
FIG. 17 illustrates a flowchart depicting an exemplary HCS random number method.

Referencing the flowchart of FIG. 17 (1700), the HCS portion of the random number generator incorporates the following method steps:
(1) On the HCS, use the operating system cryptographically secure pseudo random number generator (CSPRNG) for generation of random numbers to select random coordinates for the MUD. As an example, in MICROSOFT® WINDOWS®, use CryptGenRandom (1701);
(2) In the HCS, use CryptGenRandom to generate and transmit random coordinates for a polygon and threshold to the MUD (1702);
(3) With the HCS, form the seed for the random number generator by supplying the received random bits that are buffered from the MUD. Those bits are then combined with both the operating system's stored seed and various system data such as the process ID, process thread ID, system clock, system, time, system counter, memory status, free disk clusters, memory data checksum, mass storage data checksum, Ethernet traffic data checksum, etc. The result is used to seed the pseudo random number generator buffer. (1703); and
(4) The final result from the PRNG will be used to seed the initialization vector for crypto (1704).

Figure 18:
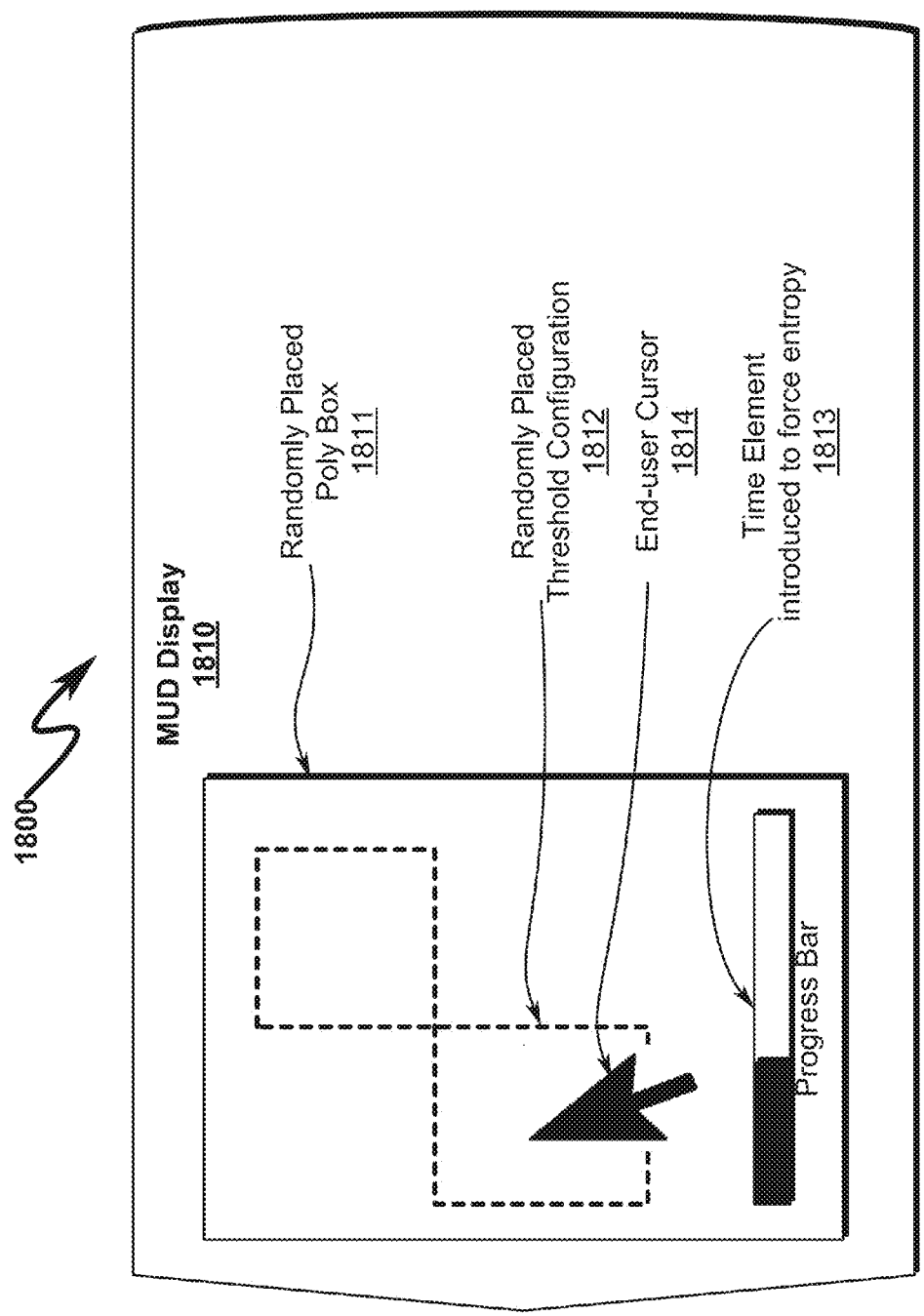
FIG. 18 illustrates an exemplary MUD display illustrating random number gesture collection.

This HCS method is used in conjunction with software running on the MUD to interact with the end-user as depicted generally in FIG. 18 (1800). Here the MUD display (1810) is injected with a randomly placed polygon box (poly box) (1811) in which a randomly placed threshold configuration (1812) is placed. A progress bar (1813) is used to provide feedback to the user as the end-user manipulates a cursor (1814) over the MUD display (1810). As this cursor (1814) is moved over the random image presented within the poly box (1811), the MUD thin client application is gathering randomization information based on the underlying pixel value, cursor vector movements, timing of movement, acceleration, etc. The general process on the MUD side of this activity may be summarized as depicted in the flowchart in FIG. 19 (1900) in the following method steps:
(1) A poly box is placed on the MUD client device user interface. The area inside this poly box is where a user is required to move a mouse, swipe a finger, or use some other sensor mechanism to provide and capture random bits of data based on cursor vectors. (1901);
(2) A threshold configuration is placed inside the first poly box to force entropy for randomness. The user is required to swipe or mouse into and out of this configuration correctly before the progress bar will be advanced. As an example, if a user were to make very small circles in the upper left corner of the diagram configuration shown in FIG. 18, the MUD would not capture data. If large mouse movements or swipes into and out of the threshold area continue, data is captured for the random number generator. (1902);
(3) If all criteria are met regarding the poly box and threshold on the MUD, then the user must continue to meet criteria for a minimum length of time to force entropy. (1903)

This cooperating general methods may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Figure 20:
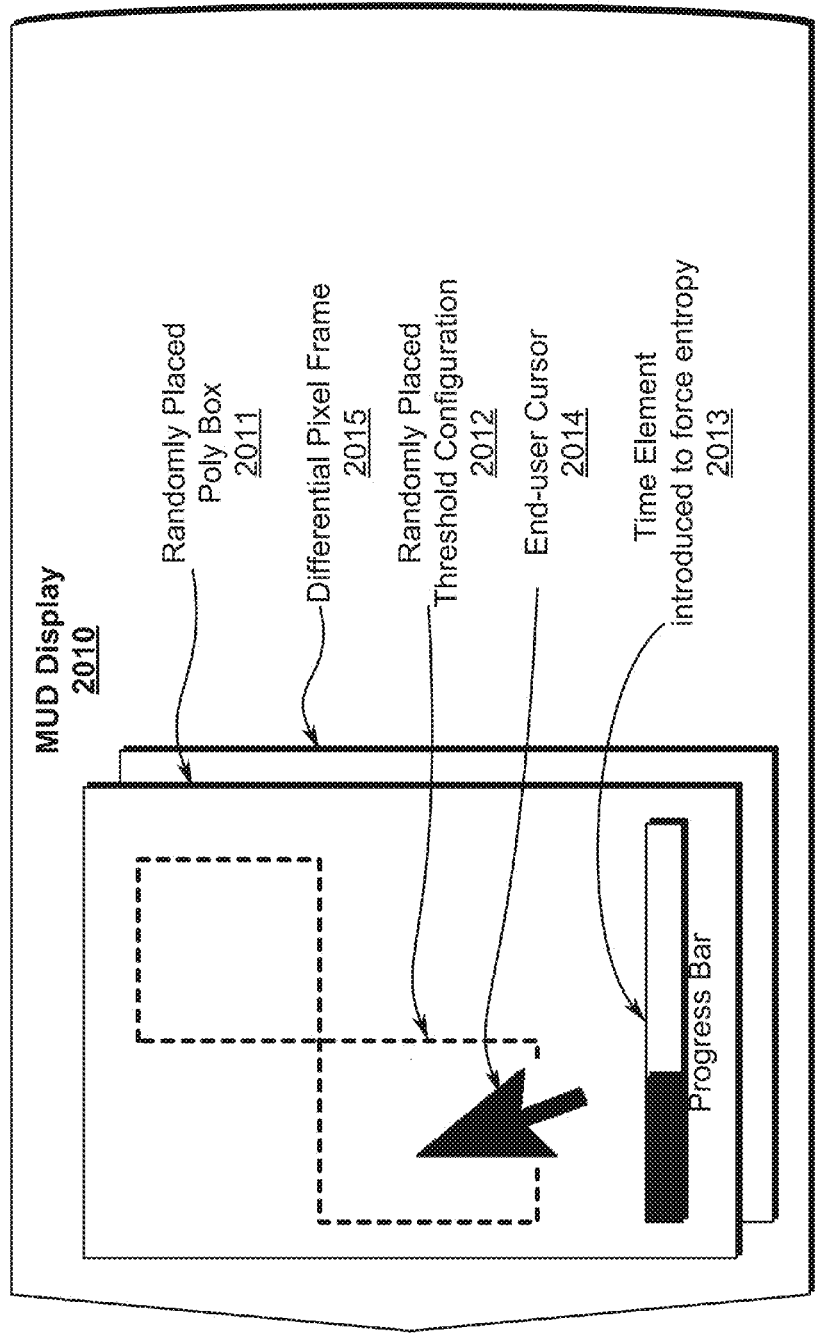
FIG. 20 illustrates an exemplary MUD display illustrating random number gesture collection with temporal frame differentials.

As generally depicted in FIG. 20 (2000), the negotiation between the HCS and MUD may be in some embodiments altered to allow for swiping of areas on a fixed randomly placed poly box (2011) or in some circumstances may utilize a temporally different video plane (2015) such that pixel information is extracted as the cursor (2014) is moved across the surface of the randomly generated image in the randomly placed poly box (2011).

Some preferred embodiments of the present invention may transmit the random pixel information to the MUD in a form that may be merged with existing display data on the MUD such that the original MUD image "underneath" the random pixel data is still slightly visible when "covered" by the random pixel data. This in some circumstance allows the entropy generation by the end-user as the cursor is moved around to occur without a detrimental impact on the visibility of the underlying MUD display data.

Exemplary Steganographic Embedding (2100)-(2400)

Figure 21:
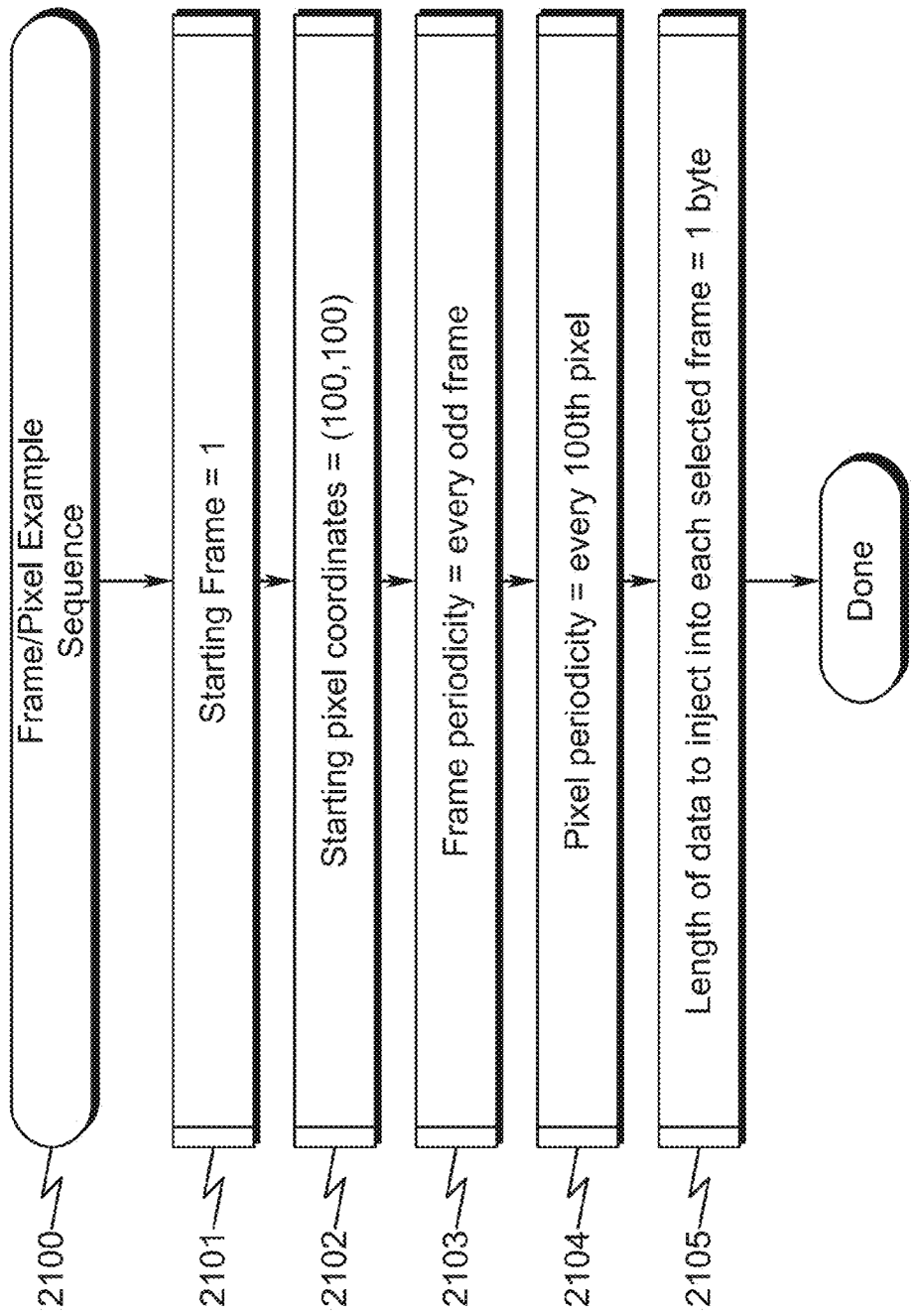
FIG. 21-24 illustrate an exemplary data embedding using steganographic encoding with the present invention.
Figure 22:
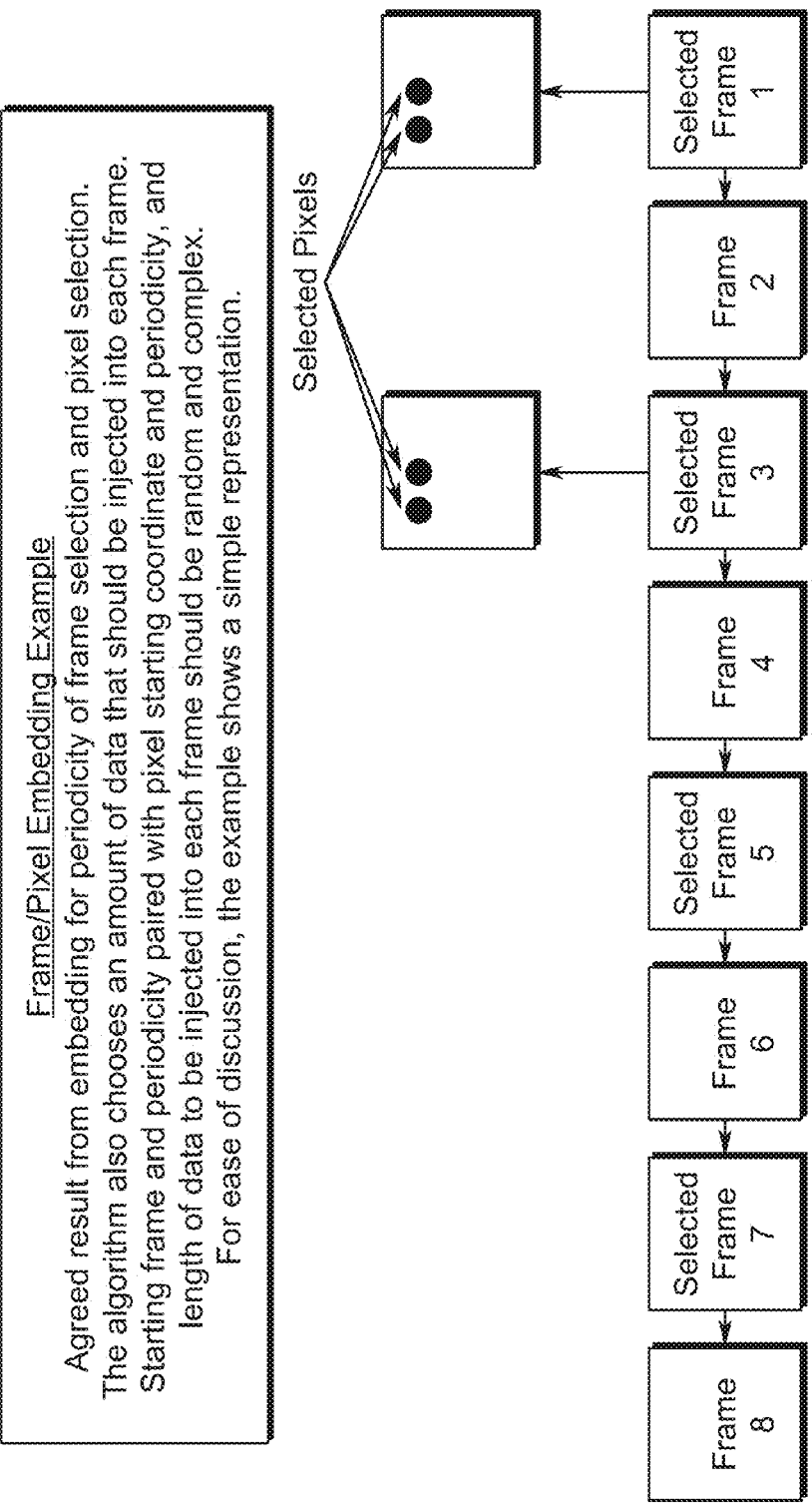
Figure 23:
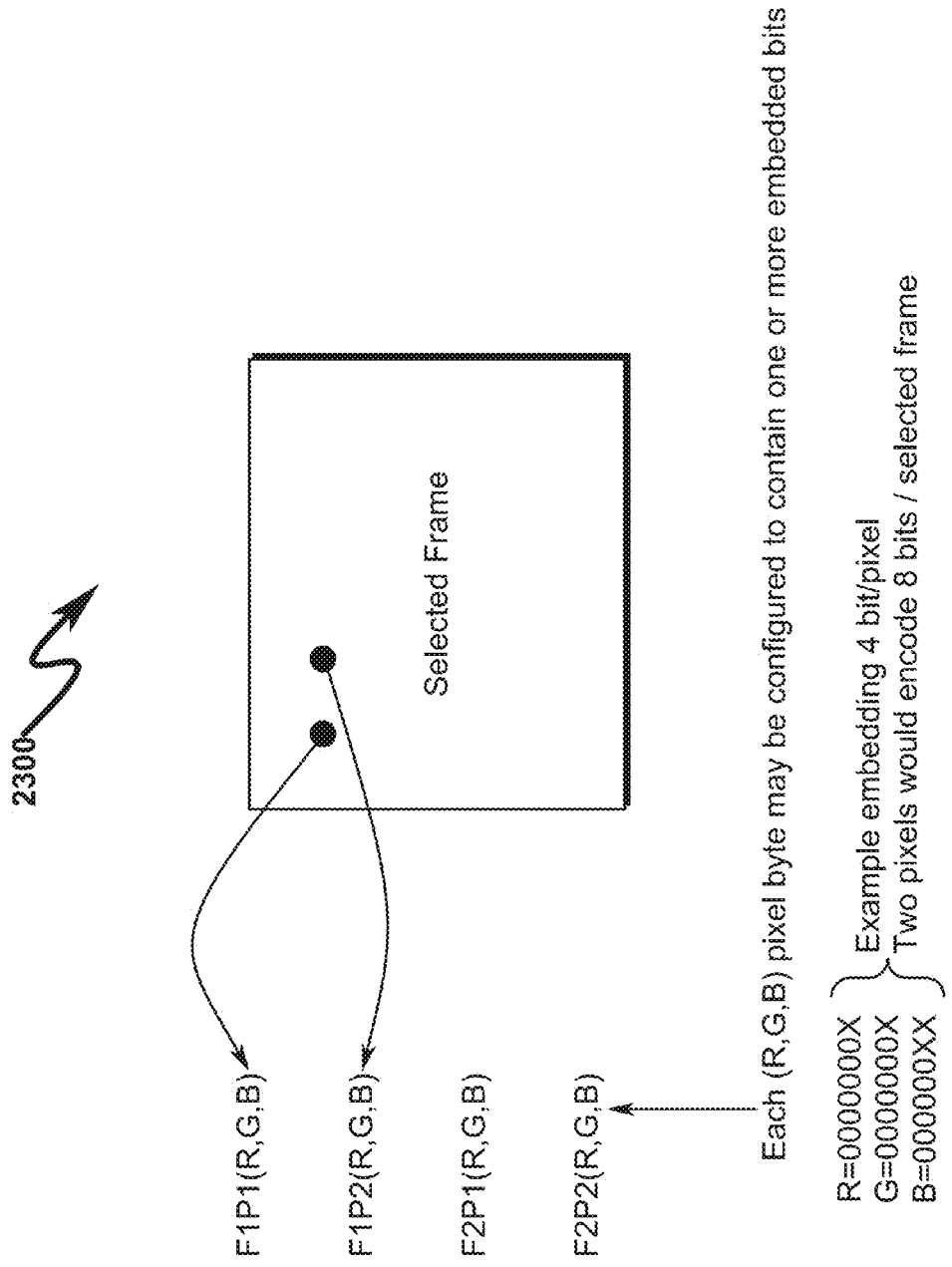
Figure 24:
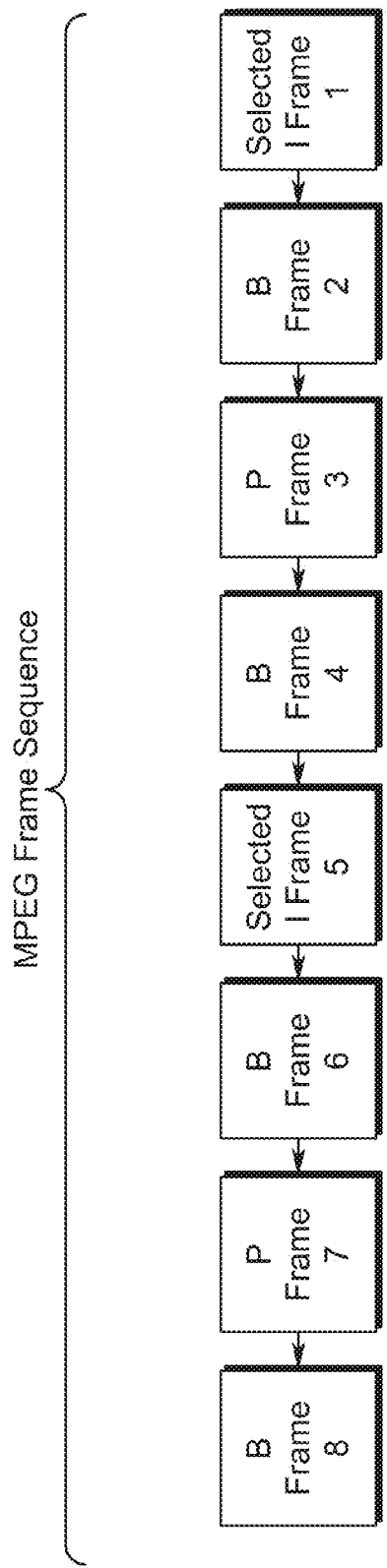

As generally depicted in FIG. 21 (2100)-FIG. 24 (2400), the present invention anticipates the use of steganographic encoding in both the initialization sequence and in the secure communications mode of operation. In this example FIG. 21 (2100) configures operational parameters associated with the stego payload encoding/decoding. FIG. 22 (2200) depicts the selection of individual pixels with in selected frames of the VMC. FIG. 23 (2300) depicts how individual data payload bits may be encoded within the video frame elements according to the parameters provided in FIG. 21 (2100). One skilled in the art will recognize that other encoding methodologies may be used for initial HCS/MUD communication.

As depicted in FIG. 24 (2400), the data embedding may include the use of I-frames within a conventional MPEG or other video data compression technology. This allows VMC information to be sent to the MUD with encoded I-frame data used by the MUD to initiate randomization gestures which are then sent to the HCS for use in generating robust encryption keys.

System Summary

The present invention system anticipates a wide variety of variations in the basic theme of construction, but can be generalized as a video cryptography system comprising:
(a) host computer system (HCS);
(b) pseudo random number generator (PNRG);
(c) mobile user device (MUD); and
(d) computer communication network (CCN);
wherein
the HCS is configured to generate a random video image (RVI) with the PNRG;
the HCS is configured to transmit the RVI and stream video media content (VMC) to the MUD through the CCN using a non-secure communication channel;
the MUD is configured to present the VMC and the RVI on a display for an end-user;
the MUD is configured to accept graphical user interaction (GUI) on the display from the end-user via a user input device (UID) on the MUD;

the MUD is configured to monitor the GUI to determine if the GUI intersects the RVI;

the MUD is configured to collect a random gesture data (RGD) from the GUI based on the activities of the end-user with respect to the UID;

the MUD is configured to transmit the RGD to the HCS;

the HCS is configured to receive the RGD and use the RGD as a seed for a cryptographic communication algorithm (CCA); and the HCS is configured to establish secure communications with the MUD using the CCA.

This general system summary may be augmented by the various elements described herein to produce a wide variety of invention embodiments consistent with this overall design description.

Method Summary

The present invention method anticipates a wide variety of variations in the basic theme of implementation, but can be generalized as a video cryptography method comprising:

(1) Establishing non-secure communication between a host computer system (HCS) and mobile user device (MUD) through a computer communication network (CCN);

(2) Streaming video media content (VMC) from the HCS to the MUD based on the current security state (secured/unsecured);

(3) Determining if the HCS or the MUD has requested secure key regeneration, and if not, proceeding to step (2);

(4) Generating a random video image (RVI) and transmitting the RVI to the MUD;

(5) Displaying the RVI on the MUD;

(6) Activating a pixel collection cursor (PCC) on the MUD and positioning the PCC over the RVI;

(7) Collecting random gesture data (RGD) from an end-user interacting with the MUD to manipulate the PCC to select RVI pixels under the PCC on the RVI displayed on the MUD;

(8) Transmitting the RGD to the HCS;

(9) Generating random encryption keys (REK) on the HCS from the RGD received from the MUD;

(10) Establishing secure communication between the HCS and the MUD using the REK; and

(11) Transferring secure data within a video stream between the HCS and the MUD using the REK and proceeding to step (2).

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the CCN comprises the Internet.

An embodiment wherein the MUD is selected from a group consisting of: smartphone; IPHONE®; cellular phone; computer tablet; IPAD®; laptop; and desktop computer.

An embodiment wherein the VMC comprises a compressed video communication (CVC) format selected from a group consisting of: MPEG; MPEG-2; MPEG-4; H.264; THEORA; WEBM; DIRAC; REALVIDEO; VP8; and HEVC.

An embodiment wherein the VMC comprises a compressed audio/video communication (CVC) format selected from a group consisting of: MPEG; MPEG-2; MPEG-4; H.264; THEORA; WEBM; DIRAC; REALVIDEO; VP8; and HEVC.

An embodiment wherein the RVI is generated using data collected from a data source within the HCS selected from a group consisting of: process ID; process thread ID; system clock; system time; system counter; memory status; free disk clusters; memory data checksum; mass storage data checksum; and Ethernet traffic data checksum.

An embodiment wherein the RVI is merged with background video content contained in the VMC.

An embodiment wherein the RVI has a shape that is defined by data entered by the end-user on the MUD.

An embodiment wherein the RGD is collected over a plurality of video frames within the VMC.

An embodiment wherein the RGD is collected by an application process on the MUD that provides interactive responses to the end-user to indicate a real-time entropy level of the RGD as the RGD is defined by the end-user.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., hard disks and USB thumb drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re *Beauregard*, 35 USPQ2d 1383 (U.S. Pat. No. 5,710,578), the present invention anticipates and includes this type of computer readable media within the scope of the invention. Pursuant to In re *Nuijten*, 500 F.3d 1346 (Fed. Cir. 2007) (U.S. patent application Ser. No. 09/211,928), the present invention scope is limited to computer readable media wherein the media is both tangible and non-transitory.

CONCLUSION

A system and method implementing video/multimedia cryptography to use steganography in order to embed secret source data in a graphical user experience (GEX) generated by a host computing system (HCS) and streamed to a remote user on a mobile computing device (MUD) has been disclosed. The system and method augments multiple secure remote computing concepts by applying steganography to a bidirectional GEX stream. Traditional steganographic techniques handle file sizes of fixed length, where a single steganographic key embeds and extracts the secret source data for the entire file. For streams of indefinite length, use of a single steganographic key poses a security risk. The security risk is mitigated by the self-regulating indefinite stream system (SRIS). The SRIS is composed of a novel initialization vector system (IVS), a self-seeding reference key system (SRKS), and a non-contiguous pixel/frame reference system (NPRS) to provide continuous security for the entire life of the stream. The NPRS works in conjunction with an adaptive steganographic capacity system (ASCS) to vary the secret source data placement and complexity based on the steganographic capacity of each frame.

CLAIMS INTERPRETATION

The following rules apply when interpreting the CLAIMS of the present invention:

- The CLAIM PREAMBLE should be considered as limiting the scope of the claimed invention.
- "WHEREIN" clauses should be considered as limiting the scope of the claimed invention.
- "WHEREBY" clauses should be considered as limiting the scope of the claimed invention.
- "ADAPTED TO" clauses should be considered as limiting the scope of the claimed invention.
- "ADAPTED FOR" clauses should be considered as limiting the scope of the claimed invention.
- The term "MEANS" specifically invokes the means-plus-function claims limitation recited in 35 U.S.C. §112(f) and such claim shall be construed to cover the corresponding structure, material, or acts described in the specification and equivalents thereof.
- The phrase "MEANS FOR" specifically invokes the means-plus-function claims limitation recited in 35 U.S.C. §112(f) and such claim shall be construed to cover the corresponding structure, material, or acts described in the specification and equivalents thereof.
- The phrase "STEP FOR" specifically invokes the step-plus-function claims limitation recited in 35 U.S.C. §112(f) and such claim shall be construed to cover the corresponding structure, material, or acts described in the specification and equivalents thereof.
- The phrase "AND/OR" in the context of an expression "X and/or Y" should be interpreted to define the set of "(X and Y)" in union with the set "(X or Y)" as interpreted by *Ex Parte Gross* (USPTO Patent Trial and Appeal Board, Appeal 2011-004811, Ser. No. 11/565,411, ("'and/or' covers embodiments having element A alone, B alone, or elements A and B taken together").
- The claims presented herein are to be interpreted in light of the specification and drawings presented herein with sufficiently narrow scope such as to not preempt any abstract idea.
- The claims presented herein are to be interpreted in light of the specification and drawings presented herein with sufficiently narrow scope such as to not preclude every application of any idea.
- The claims presented herein are to be interpreted in light of the specification and drawings presented herein with sufficiently narrow scope such as to preclude any basic mental process that could be performed entirely in the human mind.
- The claims presented herein are to be interpreted in light of the specification and drawings presented herein with sufficiently narrow scope such as to preclude any process that could be performed entirely by human manual effort.

CLAIMS

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A video cryptography system comprising:
(a) host computer system (HCS);
(b) pseudo random number generator (PNRG);
(c) mobile user device (MUD); and
(d) computer communication network (CCN);
wherein
said HCS is configured to generate a random video image (RVI) with said PNRG;
said HCS is configured to transmit said RVI and stream video media content (VMC) to said MUD through said CCN using a non-secure communication channel;
said MUD is configured to present said VMC and said RVI on a display for an end-user;
said RVI has a polygonal shape that is defined by data entered by said end-user on said MUD;
said MUD is configured to accept graphical user interaction (GUI) on said display from said end-user via a user input device (UID) on said MUD;
said MUD is configured to monitor said GUI to determine if said GUI intersects said RVI;
said MUD is configured to collect a random gesture data (RGD) from said GUI based on the activities of said end-user with respect to said UID;
said MUD is configured to transmit said RGD to said HCS;
said HCS is configured to receive said RGD and use said RGD as a seed for a cryptographic communication algorithm (CCA); and
said HCS is configured to establish secure communications with said MUD using said CCA.

2. The video cryptography system of claim 1 wherein said CCN comprises the Internet.

3. The video cryptography system of claim 1 wherein said MUD is selected from a group consisting of: smartphone; IPHONE®; cellular phone; computer tablet; IPAD®; laptop; and desktop computer.

4. The video cryptography system of claim 1 wherein said VMC comprises a compressed video communication (CVC) format selected from a group consisting of: MPEG; MPEG-2; MPEG-4; H.264; THEORA; WEBM; DIRAC; REALVIDEO; VP8; and HEVC.

5. The video cryptography system of claim 1 wherein said VMC comprises a compressed audio/video communication (CVC) format selected from a group consisting of: MPEG; MPEG-2; MPEG-4; H.264; THEORA; WEBM; DIRAC; REALVIDEO; VP8; and HEVC.

6. The video cryptography system of claim 1 wherein said RVI is generated using data collected from a data source within said HCS selected from a group consisting of: process ID; process thread ID; system clock; system time; system counter; memory status; free disk clusters; memory data checksum; mass storage data checksum; and Ethernet traffic data checksum.

7. The video cryptography system of claim 1 wherein said RVI is merged with background video content contained in said VMC.

8. The video cryptography system of claim 1 wherein said RGD is collected over a plurality of video frames within said VMC.

9. The video cryptography system of claim 1 wherein said RGD is collected by an application process on said MUD that provides interactive responses to said end-user to indicate a real-time entropy level of said RGD as said RGD is defined by said end-user.

10. A video cryptography method comprising:
    (1) Establishing non-secure communication between a host computer system (HCS) and mobile user device (MUD) through a computer communication network (CCN);
    (2) Streaming video media content (VMC) from said HCS to said MUD based on a current secured/unsecured security state;
    (3) Determining if said HCS or said MUD has requested secure key regeneration, and if not, proceeding to step (2);
    (4) Generating a random video image (RVI) and transmitting said RVI to said MUD;
    (5) Displaying said RVI on said MUD;
    (6) Activating a pixel collection cursor (PCC) on said MUD and positioning said PCC over said RVI;
    (7) Collecting random gesture data (RGD) from an end-user interacting with said MUD to manipulate said PCC to select RVI pixels under said PCC on said RVI displayed on said MUD;
    (8) Transmitting said RGD to said HCS;
    (9) Generating random encryption keys (REK) on said HCS from said RGD received from said MUD;
    (10) Establishing secure communication between said HCS and said MUD using said REK; and
    (11) Transferring secure data within a video stream between said HCS and said MUD using said REK and proceeding to step (2);
    wherein:
    said RVI has a polygonal shape that is defined by data entered by said end-user on said MUD.

11. The video cryptography method of claim 10 wherein said CCN comprises the Internet.

12. The video cryptography method of claim 10 wherein said MUD is selected from a group consisting of: smartphone; IPHONE®; cellular phone; computer tablet; IPAD®; laptop; and desktop computer.

13. The video cryptography method of claim 10 wherein said VMC comprises a compressed video communication (CVC) format selected from a group consisting of: MPEG; MPEG-2; MPEG-4; H.264; THEORA; WEBM; DIRAC; REALVIDEO; VP8; and HEVC.

14. The video cryptography method of claim 10 wherein said VMC comprises a compressed audio/video communication (CVC) format selected from a group consisting of: MPEG; MPEG-2; MPEG-4; H.264; THEORA; WEBM; DIRAC; REALVIDEO; VP8; and HEVC.

15. The video cryptography method of claim 10 wherein said RVI is generated using data collected from a data source within said HCS selected from a group consisting of: process ID; process thread ID; system clock; system time; system counter; memory status; free disk clusters; memory data checksum; mass storage data checksum; and Ethernet traffic data checksum.

16. The video cryptography method of claim 10 wherein said RVI is merged with background video content contained in said VMC.

17. The video cryptography method of claim 10 wherein said RGD is collected over a plurality of video frames within said VMC.

18. The video cryptography method of claim 10 wherein said RGD is collected by an application process on said MUD that provides interactive responses to said end-user to indicate a real-time entropy level of said RGD as said RGD is defined by said end-user.

19. A tangible non-transitory computer usable medium having computer-readable program code means comprising a video cryptography method comprising:
    (1) Establishing non-secure communication between a host computer system (HCS) and mobile user device (MUD) through a computer communication network (CCN);
    (2) Streaming video media content (VMC) from said HCS to said MUD based on a current secured/unsecured security state;
    (3) Determining if said HCS or said MUD has requested secure key regeneration, and if not, proceeding to step (2);
    (4) Generating a random video image (RVI) and transmitting said RVI to said MUD;
    (5) Displaying said RVI on said MUD;
    (6) Activating a pixel collection cursor (PCC) on said MUD and positioning said PCC over said RVI;
    (7) Collecting random gesture data (RGD) from an end-user interacting with said MUD to manipulate said PCC to select RVI pixels under said PCC on said RVI displayed on said MUD;
    (8) Transmitting said RGD to said HCS;
    (9) Generating random encryption keys (REK) on said HCS from said RGD received from said MUD;
    (10) Establishing secure communication between said HCS and said MUD using said REK; and
    (11) Transferring secure data within a video stream between said HCS and said MUD using said REK and proceeding to step (2);
    wherein:
    said RVI has a polygonal shape that is defined by data entered by said end-user on said MUD.

20. The computer usable medium of claim 19 wherein said CCN comprises the Internet.

21. The computer usable medium of claim 19 wherein said MUD is selected from a group consisting of: smartphone; IPHONE®; cellular phone; computer tablet; IPAD®; laptop; and desktop computer.

22. The computer usable medium of claim 19 wherein said VMC comprises a compressed video communication (CVC) format selected from a group consisting of: MPEG; MPEG-2; MPEG-4; H.264; THEORA; WEBM; DIRAC; REALVIDEO; VP8; and HEVC.

23. The computer usable medium of claim 19 wherein said VMC comprises a compressed audio/video communication (CVC) format selected from a group consisting of: MPEG; MPEG-2; MPEG-4; H.264; THEORA; WEBM; DIRAC; REALVIDEO; VP8; and HEVC.

24. The computer usable medium of claim 19 wherein said RVI is generated using data collected from a data source within said HCS selected from a group consisting of: process ID; process thread ID; system clock; system time; system counter; memory status; free disk clusters; memory data checksum; mass storage data checksum; and Ethernet traffic data checksum.

25. The computer usable medium of claim 19 wherein said RVI is merged with background video content contained in said VMC.

26. The computer usable medium of claim 19 wherein said RGD is collected over a plurality of video frames within said VMC.

27. The computer usable medium of claim 19 wherein said RGD is collected by an application process on said MUD that provides interactive responses to said end-user to indicate a real-time entropy level of said RGD as said RGD is defined by said end-user.

* * * * *